US010855532B2

(12) United States Patent
Bhatt et al.

(10) Patent No.: US 10,855,532 B2
(45) Date of Patent: Dec. 1, 2020

(54) SYSTEM AND METHOD TO PERFORM SOLUTION AWARE SERVER COMPLIANCE AND CONFIGURATION

(71) Applicant: Dell Products L.P., Round Rock, TX (US)

(72) Inventors: Vijay Bhatt, Madhapar (IN); Bhimaraju Vadde, Bangalore (IN)

(73) Assignee: Dell Products L.P., Round Rock, TX (US)

( * ) Notice: Subject to any disclaimer, the term of this patent is extended or adjusted under 35 U.S.C. 154(b) by 88 days.

(21) Appl. No.: 16/154,081

(22) Filed: Oct. 8, 2018

(65) Prior Publication Data

US 2020/0112477 A1 Apr. 9, 2020

(51) Int. Cl.
*H04L 12/24* (2006.01)
*G06F 16/28* (2019.01)

(52) U.S. Cl.
CPC ........ *H04L 41/0806* (2013.01); *G06F 16/288* (2019.01); *H04L 41/0853* (2013.01); *H04L 41/0893* (2013.01); *H04L 41/12* (2013.01); *H04L 41/22* (2013.01)

(58) Field of Classification Search
CPC ......... H04L 29/06047; H04L 29/08162; H04L 29/0872; H04L 67/1002; H04L 29/08225; H04L 29/08522; H04L 67/1091; H04L 67/42
USPC .......................................................... 709/203
See application file for complete search history.

(56) References Cited

U.S. PATENT DOCUMENTS

| 8,286,195 | B2 | 10/2012 | Finger |
| 8,689,227 | B2 | 4/2014 | Blanding |
| 9,396,028 | B2 | 7/2016 | Chen |
| 9,569,271 | B2 | 2/2017 | Farhan et al. |
| 9,575,811 | B2 | 2/2017 | Farhan et al. |
| 9,678,798 | B2 | 6/2017 | Farhan et al. |
| 9,684,540 | B2 | 6/2017 | Farhan et al. |

(Continued)

FOREIGN PATENT DOCUMENTS

WO    2013/180703    12/2013

OTHER PUBLICATIONS

International Search Report and Written Opinion, Application No. PCT/US2016/012329; 12 pages, dated Apr. 15, 2016.

(Continued)

*Primary Examiner* — Mahran Y Abu Roumi
(74) *Attorney, Agent, or Firm* — Baker Botts L.L.P.

(57) ABSTRACT

In one or more embodiments, one or more systems, methods, and/or processes may receive a selection that indicates a server component of a list of server components associated with records associated with a first relation and associated with server components; may determine, based at least on the selection that indicates the server component, a list of capabilities associated with the server component from records associated with a second relation and associated with capabilities of server components; may receive a selection of at least one capability from the list of capabilities; may determine if one or more records, associated with a fourth relation and associated with one or more servers, are associated with the at least one capability and the server component; and if so, may provide a list of one or more server identifications, associated with the one or more records, that indicate the one or more servers.

20 Claims, 15 Drawing Sheets

(56) References Cited

U.S. PATENT DOCUMENTS

| | | | |
|---|---|---|---|
| 10,075,559 B1* | 9/2018 | Brox | H04L 67/34 |
| 10,229,251 B1* | 3/2019 | Dalessio | G06F 8/71 |
| 2003/0058277 A1* | 3/2003 | Bowman-Amuah | G06F 16/289 |
| | | | 715/765 |
| 2007/0021998 A1* | 1/2007 | Laithwaite | G06Q 10/06311 |
| | | | 705/7.13 |
| 2007/0168244 A1 | 7/2007 | Dan | |
| 2007/0198982 A1 | 8/2007 | Bolan et al. | |
| 2007/0240161 A1* | 10/2007 | Prabhakar | G06F 9/5072 |
| | | | 718/104 |
| 2008/0200256 A1* | 8/2008 | Gagner | G07F 17/323 |
| | | | 463/42 |
| 2008/0270523 A1 | 10/2008 | Parmar et al. | |
| 2009/0100435 A1 | 4/2009 | Papaefstathiou et al. | |
| 2009/0309726 A1* | 12/2009 | Fritchie | G16H 40/40 |
| | | | 340/568.1 |
| 2010/0064763 A1* | 3/2010 | Gaikwad | H04L 41/0806 |
| | | | 73/1.01 |
| 2010/0114618 A1* | 5/2010 | Wilcock | G06Q 10/06375 |
| | | | 705/7.37 |
| 2011/0154353 A1 | 6/2011 | Theroux et al. | |
| 2011/0231899 A1* | 9/2011 | Pulier | H04L 63/0272 |
| | | | 726/1 |
| 2012/0192186 A1 | 7/2012 | Bornstein | |
| 2013/0332303 A1* | 12/2013 | Schank | H04L 41/0856 |
| | | | 705/26.4 |
| 2014/0012922 A1* | 1/2014 | Wu | G06F 16/972 |
| | | | 709/205 |
| 2014/0108639 A1 | 4/2014 | Nelke et al. | |
| 2014/0201518 A1* | 7/2014 | Yao | H04L 9/0891 |
| | | | 713/155 |
| 2014/0316845 A1* | 10/2014 | Nayak | G06F 11/3447 |
| | | | 705/7.28 |
| 2015/0052536 A1 | 2/2015 | Sah | |
| 2015/0066470 A1 | 3/2015 | Chopra | |
| 2015/0169036 A1 | 6/2015 | Sodhi et al. | |
| 2016/0306644 A1 | 10/2016 | Kelly | |
| 2017/0123777 A1* | 5/2017 | Mittal | G06F 8/71 |
| 2017/0293447 A1* | 10/2017 | Bivens | G06F 12/0284 |

OTHER PUBLICATIONS

International Search Report and Written Opinion, Application No. PCT/US2016/012317; 13 pages, dated Mar. 23, 2016.

* cited by examiner 280-1: *Server ID* | *Server Model*

| Server ID | Server Model |
|---|---|
| 810-1 { 102 | T330 |
| 810-2 { 335 | R230 |
| 810-3 { 1568 | R730 |
| 810-4 { 88 | T430 |
| 810-5 { 788 | T710 |

280-2: *Component ID* | *Component Model* | *Server ID*

| Component ID | Component Model | Server ID |
|---|---|---|
| 812-1 { 102 | PRO/1000 VT Quad Port | NULL |
| 812-2 { 103 | XL710 | 788 |
| 812-3 { 540 | QLogic 2662 | 1568 |
| 812-4 { 555 | 600 GB SAS | 788 |

280-3: *Firmware ID* | *Description* | *Version* | *Component ID*

| Firmware ID | Description | Version | Component ID |
|---|---|---|---|
| 814-1 { 805 | Intel XL710 firmware | 8.06 | 103 |
| 814-2 { 809 | Intel XL710 firmware | 7.1 | 103 |
| 814-3 { 1002 | PRO/1000 VT Quad Port firmware | 2.2 | 102 |
| 814-4 { 1003 | PRO/1000 VT Quad Port firmware | 2.3 | 102 |
| 814-5 { 258 | QLogic 2662 firmware | 1.2 | 540 |
| 814-6 { 352 | QLogic 2662 firmware | 2.0 | 540 |
| 814-7 { 555 | HD firmware | 1.1 | 555 |

FIG. 8A 280-4

| Capability ID | Description | Firmware ID |
|---|---|---|
| 816-1 { 541 | VXLAN | 805 |
| 816-2 { 543 | NVGRE | 805 |
| 816-3 { 804 | Virtual Machine Load Balancing | 805 |
| 816-4 { 605 | Network Partitioning | 805 |
| 816-5 { 909 | VXLAN | 809 |
| 816-4 { 710 | NVGRE Geneve | 809 |
| 816-5 { 800 | Network Partitioning | 809 |
| 816-6 { 741 | Four GigE network ports | 1002 |
| 816-7 { 503 | Four GigE network ports | 1003 |
| 816-8 { 507 | CPU Load Balancing | 1003 |
| 816-9 { 509 | Virtualization | 1003 |
| 816-10 { 510 | Virtualization | 1002 |
| 816-11 { 655 | Multiple ports | 258 |
| 816-12 { 656 | Multiple ports | 352 |
| 816-13 { 655 | Virtualization | 258 |
| 816-14 { 656 | Virtualization | 352 |
| 816-15 { 657 | Multiple Processors | 352 |
| 816-16 { 680 | Overlapping protection domains | 258 |
| 816-17 { 685 | Overlapping protection domains | 352 |
| 816-18 { 706 | Fibre Channel | 258 |
| 816-19 { 707 | Fibre Channel | 352 |
| 816-20 { 888 | 600 GB | 555 |

FIG. 8B 280-5

|  | Attribute ID | Attribute Name | Attribute Group | Attribute Type | Capability ID |
|---|---|---|---|---|---|
| 818-1 | 454 | 4 Gb Fibre Channel | 568 | Speed | 707 |
| 818-2 | 455 | 8 Gb Fibre Channel | 568 | Speed | 707 |
| 818-3 | 456 | 16 Gb Fibre Channel | 568 | Speed | 707 |
| 818-4 | 484 | 8 Gb Fibre Channel | 568 | Speed | 706 |
| 818-5 | 1005 | VLAN | Networking | NULL | 605 |
| 818-4 | 1007 | QoS | Networking | NULL | 605 |
| 818-5 | 788 | 15K RPM | Storage | Speed | 888 |
| 818-6 | 789 | 120 IOPS | Storage | Speed | 888 |

280-6

|  | Dependency ID | Attribute ID | Attribute Dependency ID | Attribute Type | Capability ID |
|---|---|---|---|---|---|
| 820-1 | 123 | 1007 | 1005 | NULL | 605 |
| 820-2 | 455 | 789 | 788 | Speed | 888 |

FIG. 8C

SYSTEM AND METHOD TO PERFORM SOLUTION AWARE SERVER COMPLIANCE AND CONFIGURATION

BACKGROUND

Field of the Disclosure

This disclosure relates generally to information handling systems and, more particularly, to a system and method to perform solution aware server compliance and configuration.

Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

SUMMARY

In one or more embodiments, one or more systems, methods, and/or processes may provide, via a user interface, a list of server components associated with multiple records associated with a first relation and associated with multiple server components; may receive a selection that indicates a server component of the list of server components; may determine, based at least on the selection that indicates the server component, a list of capabilities associated with the server component from multiple records associated with a second relation and associated with multiple capabilities of multiple server components; may provide, via the user interface, the list of capabilities; may receive a selection of at least one capability from the list of capabilities; may determine, based at least on the selection of the at least one capability, a list of attributes associated with the at least one capability from multiple records associated with a third relation and associated with multiple attributes associated with the multiple capabilities; may provide, via the user interface, the list of attributes; may receive a selection of at least one attribute from the list of attributes; and may determine if first one or more records, associated with a fourth relation and associated with first one or more servers, are associated with the at least one attribute, the at least one capability, and the server component. If the first one or more records, associated with the fourth relation and associated with the first one or more of servers, are associated with the at least one attribute, the at least one capability, and the server component, the one or more systems, methods, and/or processes may provide, via the user interface, a list of one or more server identifications, associated with the one or more records, that indicate the first one or more servers. If the first one or more records, associated with the fourth relation and associated with the multiple servers, are not associated with the at least one attribute, the at least one capability, and the server component, the one or more systems, methods, and/or processes may determine second one or more other records, associated with the fourth relation and associated with second one or more servers that partially satisfy being associated with the at least one attribute, the at least one capability, and the server component; and may provide a list of one or more server identifications, associated with the second one or more records, that indicate the second one or more servers. In one or more embodiments, the user interface may include a graphical user interface. For example, the graphical user interface may be at least a portion of a web application.

In one or more embodiments, determining, based at least on the selection that indicates the server component, the list of capabilities associated with the server component from the multiple records associated with the second relation and associated with the multiple capabilities of the multiple server components may include utilizing a first relationship associated with at least one of the first relation and the second relation, wherein the first relationship is based at least on a foreign key of the second relation. In one or more embodiments, determining, based at least on the selection of the at least one capability, the list of attributes associated with the at least one capability from the multiple records associated with the third relation and associated with the multiple attributes associated with the multiple capabilities may include utilizing a second relationship between the second relation and the third relation, wherein the second relationship is based at least on a foreign key of the third relationship.

In one or more embodiments, if the first one or more records, associated with the fourth relation and associated with the multiple servers, are not associated with the at least one attribute, the at least one capability, and the server component, the one or more systems, methods, and/or processes may further determine a configuration for a server of the second one or more servers that permits the server of the second one or more servers to be associated with the at least one attribute, the at least one capability, and the server component; and may further provide the configuration for the server of the second one or more servers. For example, after providing the configuration for the server of the second one or more servers, the server of the second one or more servers may be configured to be at least a portion of a server solution.

In one or more embodiments, the one or more systems, methods, and/or processes may further receive first information associated with the multiple server components; may further populate, based at least on the first information, the multiple records associated with the first relation and the multiple server components; may further receive second information associated with the multiple capabilities associated with the multiple server components; may further populate, based at least on the second information, the multiple records associated with the second relation and associated with the multiple capabilities; may further receive third information associated with the multiple attributes associated with the multiple of capabilities; and may further populate, based at least on the third information, the multiple records associated with the third relation and associated with the multiple attributes.

BRIEF DESCRIPTION OF THE DRAWINGS

For a more complete understanding of the present disclosure and its features/advantages, reference is now made to the following description, taken in conjunction with the accompanying drawings, which are not drawn to scale, and in which:

FIGS. 8A-8C illustrate examples of records associated with respective relations, according to one or more embodiments.

DETAILED DESCRIPTION

Figure 1:
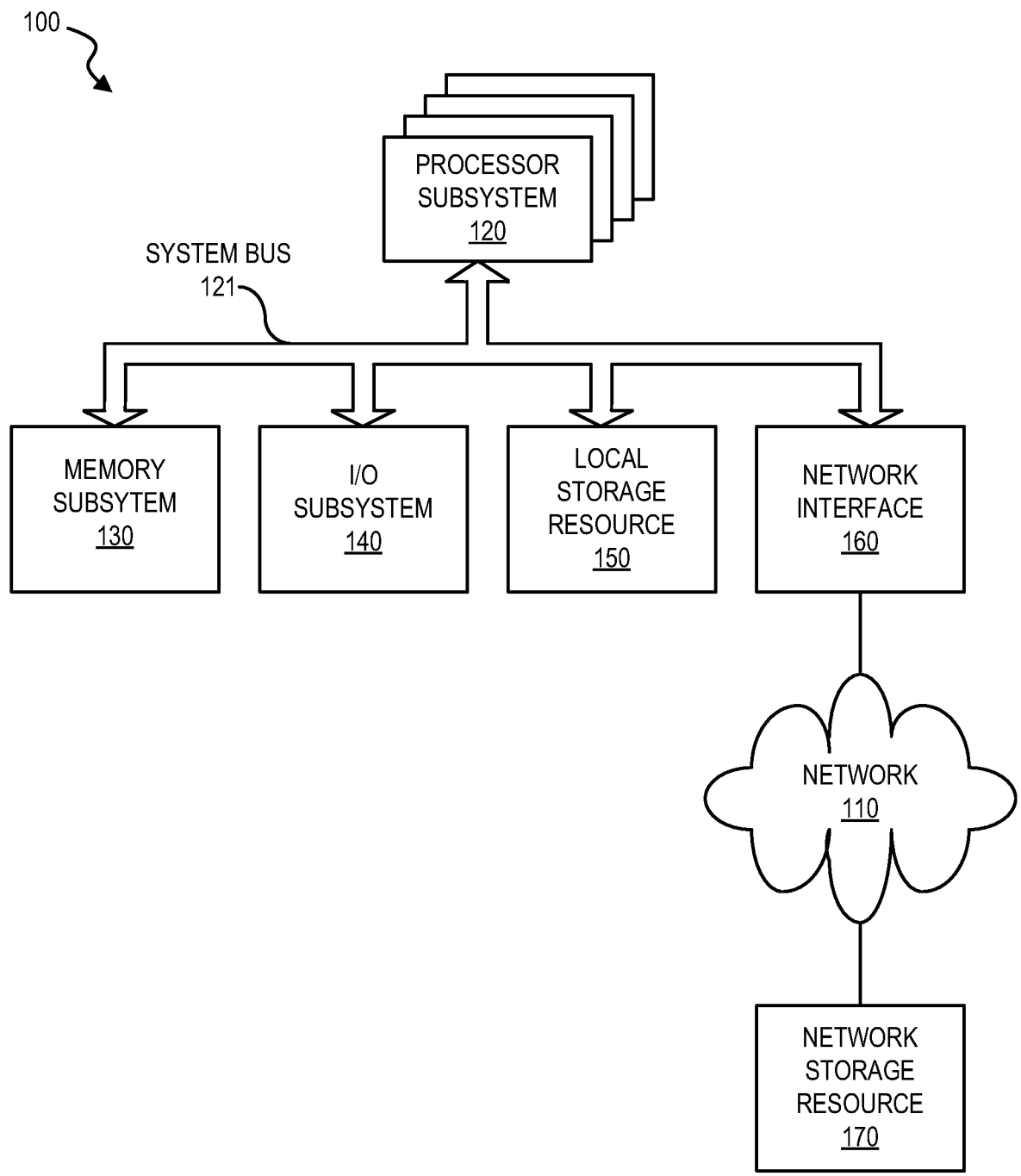
FIG. 1 illustrates an example block diagram depicting selected elements of an example of an information handling system, according to one or more embodiments.

In the following description, details are set forth by way of example to facilitate discussion of the disclosed subject matter. It should be apparent to a person of ordinary skill in the field, however, that the disclosed embodiments are exemplary and not exhaustive of all possible embodiments.

As used herein, a hyphenated form of a reference numeral refers to a specific instance of an element and the un-hyphenated form of the reference numeral refers to the collective or generic element. Thus, for example, a hypothetical entity referenced by '12-1' may refer to a particular instance of a particular class/type, and the reference '12' may refer to a collection of instances belonging to that particular class/type or any one instance of that class/type in general.

In one or more embodiments, one or more servers (e.g., one or more information handling systems) may be deployed to implement one or more server solutions. In one example, a server solution may be or include a virtual storage area network (VSAN). In a second example, a server solution may be or include a software defined storage system (ScaleIO). In another example, a server solution may be or include a high availability (HA) cluster. In one or more embodiments, a server solution may be associated with a configuration. For example, a configuration may include a disposition and/or an arrangement of components. For instance, a configuration may include a disposition and/or an arrangement of servers and/or server components. In one or more embodiments, a configuration associated with a server solution may include a minimum number of storage devices, a type of storage device, an arrangement of storage devices (e.g., a RAID (redundant arrays of inexpensive disks)), a RAID level, a minimum number of network interfaces, a minimum number of network ports, a minimum number of network ports per network interface, a network interface portioning capability, and a network interface partitioning capability, among others.

In one or more embodiments, determining a configuration associated with a server solution may include extracting profile information from a reference server. For example, the server solution may be deployed to other servers that match the profile information from the reference server. In one or more embodiments, the profile information from the reference server may include attribute-value pairs associated with configuration settings of components of the reference server. In one example, an instance of a component may be or include a basic input/output system (BIOS). For instance, the BIOS may be associated with a version of the BIOS. In a second example, a component may be or include a RAID. In one instance, the RAID may be associated with an amount of storage. In a second instance, the RAID may be associated with a number of disks. In a third instance, the RAID may be associated with a type of disk (e.g., a hard disk, a solid state disk (SSD), etc.). In another instance, the RAID may be associated with a RAID level (e.g., a RAID level "0", a RAID level "1", a RAID level "10", a RAID level "5", a RAID level "6", etc.). In another example, a component may be or include a network interface card (NIC). In one instance, the NIC may be associated with a number of network interface ports. In another instance, the NIC may be associated with a partitioning capability.

In one or more embodiments, a component instance matching approach may not consider a capability comparison. For example, the component instance matching approach may be effectively restricted in scenarios of identical servers. For instance, a reference profile may include a first NIC that includes four network interface ports, while a candidate server for a server solution may include a first NIC that that includes two network interface ports and a second NIC that includes four network interface ports. As the reference profile may include a first NIC that includes four network interface ports and as the candidate server for a server solution may include a first NIC that that includes two network interface ports, the component instance matching approach may not utilize the candidate server, since the number of ports of a first NIC may not match, according to one or more embodiments. For example, the component instance matching approach may determine that the candidate server is non-compliant with the reference profile, as the reference profile may include a first NIC that includes four network interface ports, while the candidate server for the server solution may include a first NIC that that includes two network interface ports.

In one or more embodiments, the component instance matching approach may include component instance based attribute-value pairs. For example, a reference profile may include attribute-value pairs determined from components of a reference server. In one instance, an attribute-value pair determined from a component of a reference server may include a first NIC with four network interface ports. In a second instance, an attribute-value pair determined from a component of a reference server may include a RAID with hard disks. In another instance, an attribute-value pair determined from a component of a reference server may include a RAID with solid state disks (SSDs). In one or more embodiments, the component instance matching approach may determine a candidate server for a server solution as non-compliant. In one example, if the candidate server includes a first NIC with two network interface ports and a second NIC with four network interface ports, the candidate server may be determined to be non-compliant. For instance, an attribute-value pair associated with a first NIC with four network interface ports may not match the first NIC with two network interface ports of the candidate server, even though the candidate server is capable of a NIC with four network interface ports. In one example, if the candidate server includes a RAID with SSDs, the candidate server may be determined to be non-compliant. For instance, an attribute-value pair associated with a RAID with hard disks may not match the RAID with SSDs of the candidate server, even though the candidate server is RAID capable.

In one or more embodiments, a storage repository may include server solution profiles. In one example, a server solution profile may include metadata and/or one or more relationships. In one instance, a relationship may include a server model with one or more components. In another instance, metadata may include one or more of a server identification, a server model, a component identification, and a component model, among others. In another example, a component profile may include metadata and/or one or more relationships. In one instance, a relationship may include a component model with one or more capabilities. In another instance, metadata may include one or more of a component identification, a capability identification, a capability description, a feature description, a dependency (e.g., a firmware version, a license, etc.), and a possible value, among others.

In one or more embodiments, based at least on the storage repository, guided choices for a server profile creation may be provided to a user. In one example, various combinations of capabilities, based at least on the storage repository, may be provided to the user via the guided choices. For instance, the various combinations of capabilities may be provided to the user via a user interface (e.g., a graphical user interface). In another example, various matching criteria may be specified. In one instance, a matching criterion may include a server model. In a second instance, a matching criterion may include a component model. In third instance, a matching criterion may include an instance based capability match. In another instance, a matching criterion may include an instance based attribute match.

In one or more embodiments, a user interface may include the guided choices in creating a server profile. In one example, the user interface may include a server model search and/or selection to determine a component set. In a second example, the user interface may include a component search and/or selection to determine a capability set. In a third example, the user interface may include a capability search and/or selection to determine an attribute set. In another example, the user interface may include an attribute search and/or selection to determine possible guidance values. In one or more embodiments, determining one or more servers for a server solution may include one or more capabilities associated with one or more candidate servers may be matched with one or more capabilities received via the guided choices. For example, one or more candidate servers may be determined based at least on the one or more capabilities received via the guided choices. For instance, attributes associated with the one or more candidate servers may then be matched to one or more attribute selections from the guided choices.

In one or more embodiments, a storage repository may include capability and/or configuration attribute data associated with one or more each component firmware and/or one or more firmware enhancement, among others. For example, the data may be provided to the storage repository. For instance, the data may be provided to the storage repository via a publisher/subscriber model. In one or more embodiments, the storage repository may subscribe to updates from one or more candidate servers. In one example, if a candidate server receives a component (e.g., a NIC, a RAID, a host bus adapter, etc.), the candidate server may publish data associated with the received component to the storage repository. For instance, the storage repository may have subscribed to data updates associated with one or more components of the candidate server. In another example, if a candidate server receives a firmware update (e.g., a NIC firmware update, a RAID firmware update, a host bus adapter firmware update, a BIOS update, etc.), the candidate server may publish data associated with the firmware update to the storage repository. For instance, the storage repository may have subscribed to data updates associated with one or more firmware updates of the candidate server. In this fashion, changes associated with the one or more servers for one or more server solutions may be published and/or pushed to the storage repository. For example, the storage repository may be associated with an organization that utilizes the one or more servers for and/or in configuring one or more server solutions.

In one or more embodiments, one or more management systems may receive incremental updates from a storage repository. For example, the incremental updates from the storage repository may be stored via a local copy. In one instance, the one or more management systems may one-to-one. In another instance, the one or more management systems may one-to-many. In one or more embodiments, the storage repository may be utilized in designing a solution-aware compliance check and configuration.

For the purposes of this disclosure, an information handling system may include an instrumentality or aggregate of instrumentalities operable to compute, classify, process, transmit, receive, retrieve, originate, switch, store, display, manifest, detect, record, reproduce, handle, or utilize various forms of information, intelligence, or data for business, scientific, control, entertainment, or other purposes. For example, an information handling system may be a personal computer, a PDA, a consumer electronic device, a network storage device, or another suitable device and may vary in size, shape, performance, functionality, and price. The information handling system may include memory, one or more processing resources such as a central processing unit (CPU) or hardware or software control logic. Additional components or the information handling system may include one or more storage devices, one or more communications ports for communicating with external devices as well as various input and output (I/O) devices, such as a keyboard, a mouse, and a video display. The information handling system may also include one or more buses operable to transmit communication between the various hardware components.

For the purposes of this disclosure, computer-readable media may include an instrumentality or aggregation of instrumentalities that may retain data and/or instructions for a period of time. Computer-readable media may include, without limitation, storage media such as a direct access storage device (e.g., a hard disk drive or floppy disk), a sequential access storage device (e.g., a tape disk drive), compact disk, CD-ROM, DVD, random access memory (RAM), read-only memory (ROM), electrically erasable programmable read-only memory (EEPROM), and/or flash memory (SSD); as well as communications media such wires, optical fibers, microwaves, radio waves, and other electromagnetic and/or optical carriers; and/or any combination of the foregoing.

Turning now to the drawings, FIG. 1 illustrates an example block diagram depicting selected elements of an example of an information handling system, according to one or more embodiments. In one or more embodiments, an information handling system (IHS) 100 may represent different types of portable information handling systems, such as, display devices, head mounted displays, head mount display systems, smart phones, tablet computers, notebook computers, media players, digital cameras, 2-in-1 tablet-laptop combination computers, and wireless organizers, or other types of portable information handling systems. In one or more embodiments, IHS 100 may also represent other types of information handling systems, including desktop computers, server systems, controllers, and microcontroller units, among other types of information handling systems. Components of IHS 100 may include, but are not limited to, a processor subsystem 120, which may comprise one or more processors, and system bus 121 that communicatively couples various system components to processor subsystem 120 including, for example, a memory subsystem 130, an I/O subsystem 140, a local storage resource 150, and a network interface 160. System bus 121 may represent a variety of suitable types of bus structures, e.g., a memory bus, a peripheral bus, or a local bus using various bus architectures in selected embodiments. For example, such architectures may include, but are not limited to, Micro Channel Architecture (MCA) bus, Industry Standard Architecture (ISA) bus, Enhanced ISA (EISA) bus, Peripheral Component Interconnect (PCI) bus, PCI-Express bus, HyperTransport (HT) bus, and Video Electronics Standards Association (VESA) local bus.

In FIG. 1, network interface 160 may be a suitable system, apparatus, or device operable to serve as an interface between IHS 100 and a network 110. Network interface 160 may enable IHS 100 to communicate over network 110 using a suitable transmission protocol and/or standard, including, but not limited to, transmission protocols and/or standards enumerated below with respect to the discussion of network 110. In some embodiments, network interface 160 may be communicatively coupled via network 110 to a network storage resource 170. Network 110 may be a public network or a private (e.g. corporate) network. The network may be implemented as, or may be a part of, a storage area network (SAN), personal area network (PAN), local area network (LAN), a metropolitan area network (MAN), a wide area network (WAN), a wireless local area network (WLAN), a virtual private network (VPN), an intranet, the Internet or another appropriate architecture or system that facilitates the communication of signals, data and/or messages (generally referred to as data). Network interface 160 may enable wired and/or wireless communications to and/or from IHS 100.

In particular embodiments, network 110 may include one or more routers for routing data between client information handling systems 100 and server information handling systems 100. A device (e.g., a client IHS 100 or a server IHS 100) on network 110 may be addressed by a corresponding network address including, for example, an Internet protocol (IP) address, an Internet name, a Windows Internet name service (WINS) name, a domain name or other system name. In particular embodiments, network 110 may include one or more logical groupings of network devices such as, for example, one or more sites (e.g. customer sites) or subnets. As an example, a corporate network may include potentially thousands of offices or branches, each with its own subnet (or multiple subnets) having many devices. One or more client information handling systems 100 may communicate with one or more server information handling systems 100 via any suitable connection including, for example, a modem connection, a LAN connection including the Ethernet or a broadband WAN connection including DSL, Cable, Ti, T3, Fiber Optics, Wi-Fi, or a mobile network connection including GSM, GPRS, 3G, or WiMax.

Network 110 may transmit data using a desired storage and/or communication protocol, including, but not limited to, Fibre Channel, Frame Relay, Asynchronous Transfer Mode (ATM), Internet protocol (IP), other packet-based protocol, small computer system interface (SCSI), Internet SCSI (iSCSI), Serial Attached SCSI (SAS) or another transport that operates with the SCSI protocol, advanced technology attachment (ATA), serial ATA (SATA), advanced technology attachment packet interface (ATAPI), serial storage architecture (SSA), integrated drive electronics (IDE), and/or any combination thereof. Network 110 and its various components may be implemented using hardware, software, or any combination thereof.

As depicted in FIG. 1, processor subsystem 120 may comprise a system, device, or apparatus operable to interpret and/or execute program instructions and/or process data, and may include a microprocessor, microcontroller, digital signal processor (DSP), application specific integrated circuit (ASIC), or another digital or analog circuitry conFIG.d to interpret and/or execute program instructions and/or process data. In some embodiments, processor subsystem 120 may interpret and/or execute program instructions and/or process data stored locally (e.g., in memory subsystem 130 and/or another component of information handling system). In the same or alternative embodiments, processor subsystem 120 may interpret and/or execute program instructions and/or process data stored remotely (e.g., in network storage resource 170).

Also in FIG. 1, memory subsystem 130 may comprise a system, device, or apparatus operable to retain and/or retrieve program instructions and/or data for a period of time (e.g., computer-readable media). Memory subsystem 130 may comprise random access memory (RAM), electrically erasable programmable read-only memory (EEPROM), a PCMCIA card, flash memory, magnetic storage, opto-magnetic storage, and/or a suitable selection and/or array of volatile or non-volatile memory that retains data after power to its associated information handling system, such as system 100, is powered down.

In IHS 100, I/O subsystem 140 may comprise a system, device, or apparatus generally operable to receive and/or transmit data to/from/within IHS 100. I/O subsystem 140 may represent, for example, a variety of communication interfaces, graphics interfaces, video interfaces, user input interfaces, and/or peripheral interfaces. In various embodiments, I/O subsystem 140 may be used to support various peripheral devices, such as a touch panel, a display adapter, a keyboard, an accelerometer, a touch pad, a gyroscope, an IR sensor, a microphone, a sensor, or a camera, or another type of peripheral device. As shown, I/O subsystem 140 may comprise touch panel 142 and display adapter 144. Touch panel 142 may include circuitry for enabling touch functionality in conjunction with display 146 that is driven by display adapter 144.

Local storage resource 150 may comprise computer-readable media (e.g., hard disk drive, floppy disk drive, CD-ROM, and/or other type of rotating storage media, flash memory, EEPROM, and/or another type of solid state storage media) and may be generally operable to store instructions and/or data. Likewise, the network storage resource may comprise computer-readable media (e.g., hard disk drive, floppy disk drive, CD-ROM, and/or other type of rotating storage media, flash memory, EEPROM, and/or other type of solid state storage media) and may be generally operable to store instructions and/or data.

Figure 2A:
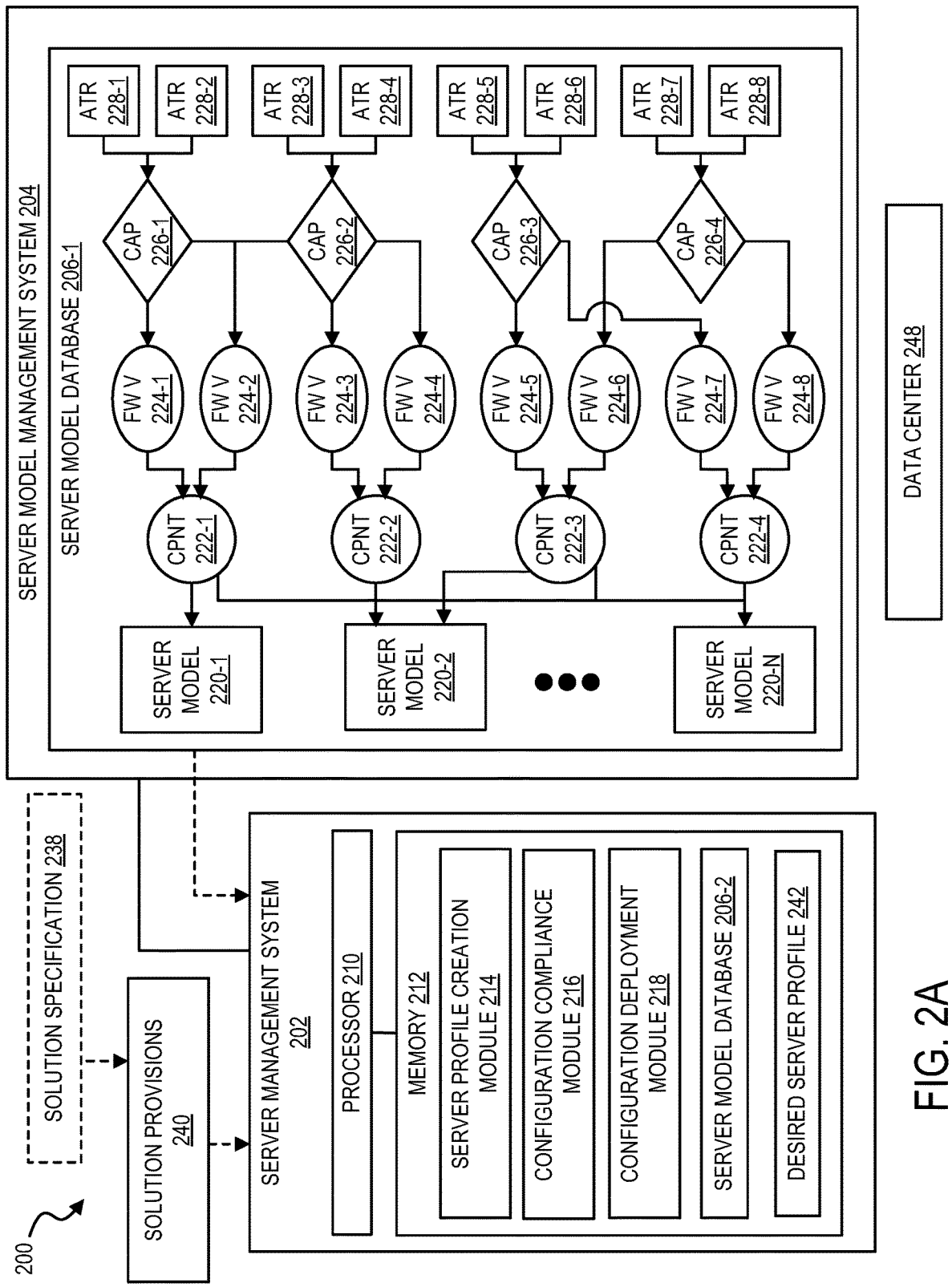
FIG. 2A illustrates an example of a server management systems environment, according to one or more embodiments.

Turning now to FIG. 2A, an example of a server management systems environment is illustrated, according to one or more embodiments. As shown, a server management systems environment 200 may include a server management system 202, a server model management system 204, and a data center 248. In one or more embodiments, server management system 202 may include one or more structures and/or one or more functionalities as those described with reference to IHS 100. In one or more embodiments, server model management system 204 may be or include a database management system. In one example, the database management system may be or include a relational database management system. In another example, the database management system may be or include a graph database management system.

As illustrated, server management system 202 may include a processor 210 and a memory 212 coupled to processor 210. As shown, memory 212 may include a server profile creation module 214, a solution compliance module 216, a server model database 206-2, and a desired server profile 242. In one of more embodiments, each of server profile creation module 214, solution compliance module 216, server model database 206-2, and desired server profile 242 may be stored via another memory device associated with server management system 202, a storage device coupled to server management system 202, or another memory or storage device. In one or more embodiments, each of server profile creation module 214 and solution compliance module 216 may include instructions that are executable by processor 210. For example, the instructions may be executable by processor 210 to implement at least a portion of one or more of a system, a method, a flowchart, and a process described herein.

In one or more embodiments, server model management system 204 may create, maintain, update, and/or leverage a server model database 206-1 that may include metadata and/or relationships associated with servers and supported components of the servers. In one or more embodiments, server model database 206-1 may include server models 220, supported components (CPNTs) 222, component firmware 224, component capabilities 226, component attributes (ATRs) 228, and associated metadata and/or relationship information associated with server models 220, supported components 222, component firmware 224, component capabilities (CAPs) 226, and/or component attributes 228, among others. In one or more embodiments, each server model 220 may be associated with a corresponding server of data center 248. For example, a server model 220 may be associated with a managed system 250 of data center 248 (illustrated in FIG. 2B). In one or more embodiments, a managed system 250 may include one or more structures and/or one or more functionalities as those described with reference to IHS 100.

In one or more embodiments, server and supported component relationship information may describe the relationship between a server model 220 and a set of components 222 supported by server model 220. In one example, server model 220-1 may support a component 222-1, among others. In a second example, a server model 220-2 may support components 222-2 and 222-3, among others. In another example, a server model 220-N may support components 222-1, 222-2, and 222-3, among others. In one or more embodiments, associated server and supported components metadata may include a server identification (ID), a server model, a component ID, and/or a component model, among others.

In one or more embodiments, components and capabilities relationship information may describe a relationship. For example, the relationship may include a component (CPNT) 222, a set of capabilities 226 of component 222, and/or dependency information, among others. As shown, component 222-1 may be associated with set of capabilities 226-1 with a dependency on firmware version 224-1, the set of capabilities 226-1 with a dependency on firmware version 224-2, and a set of capabilities 226-2 with a dependency on firmware version 224-2. Component 222-2 may be associated with a set of capabilities 226-2 with a dependency on firmware version 224-3 and a set of capabilities 226-2 with a dependency on firmware version 224-4. Component 222-3 may be associated with a set of capabilities 226-3 with a dependency on firmware version 224-5 and a set of capabilities 226-4 with a dependency on firmware version 224-6. Component 222-4 may be associated with a set of capabilities 226-3 with a dependency on firmware version 224-7 and a set of capabilities 226-4 with a dependency on firmware version 224-8. In one or more embodiments, the associated components and capabilities metadata may include a component ID, a capability ID, a capability, a feature description, and/or dependencies (e.g., a firmware version, a firmware license, etc.), among others.

In one or more embodiments, capabilities and configuration attributes relationship information may describe a relationship between a set of capabilities 226 and a set of configuration attributes 228. The set of capabilities 226-1 may be associated with the set of configuration attributes 228-1 and the set of configuration attributes 228-2. The set of capabilities 226-2 may be associated with the set of configuration attributes 228-3 and the set of configuration attributes 228-4. The set of capabilities 226-3 may be associated with the set of configuration attributes 228-5 and the set of configuration attributes 228-6. The set of capabilities 226-4 may be associated with the set of configuration attributes 228-7 and the set of configuration attributes 228-8. In one or more embodiments, associated capability and configuration attributes metadata may include the capability ID, the attribute ID, the attribute name, the attribute group, the attribute type, and/or dependencies (e.g., a firmware version, dependency on other attributes, possible attribute value, etc.), among others.

Figure 2B:
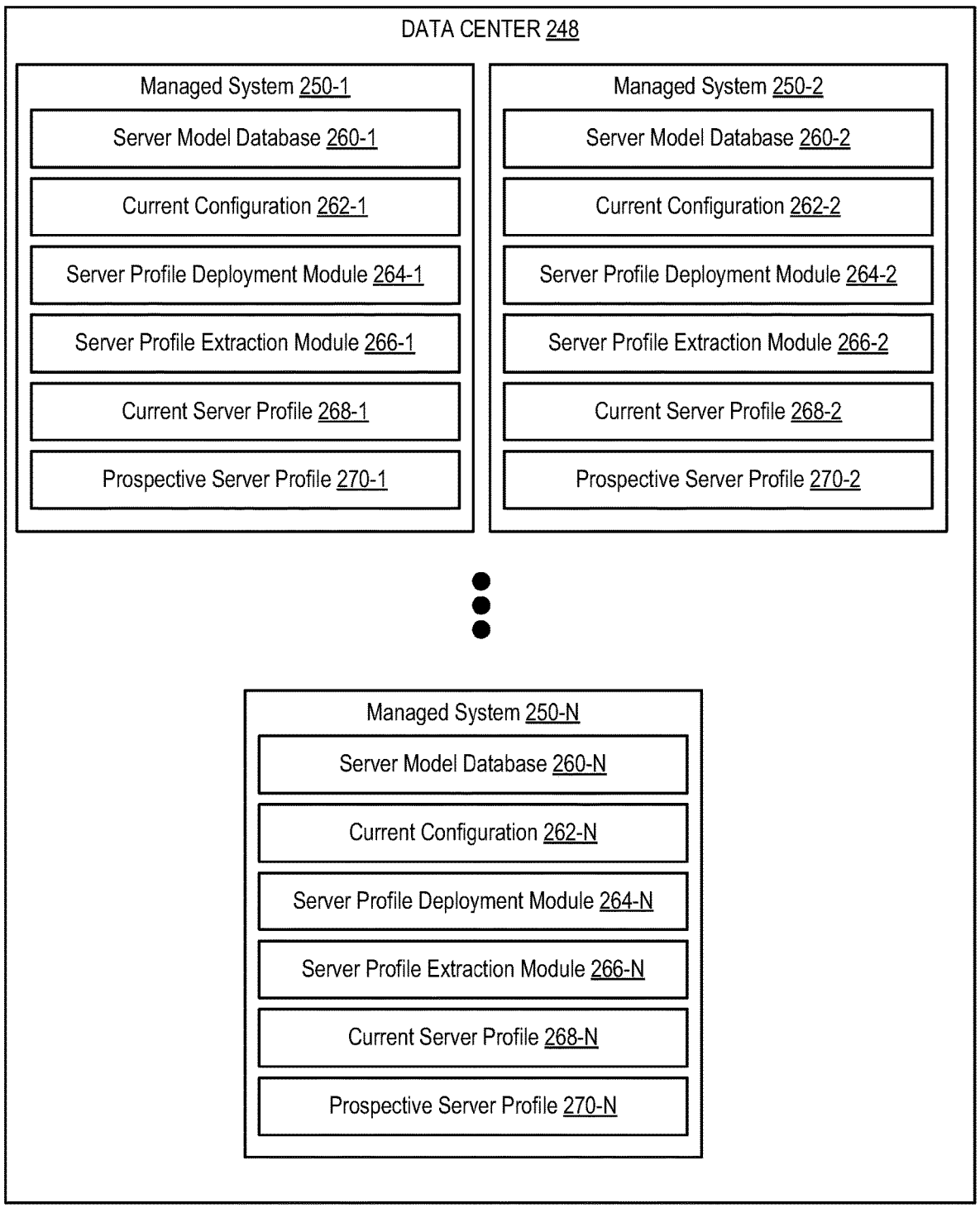
FIG. 2B illustrates examples of managed systems, according to one or more embodiments.
Figure 2C:
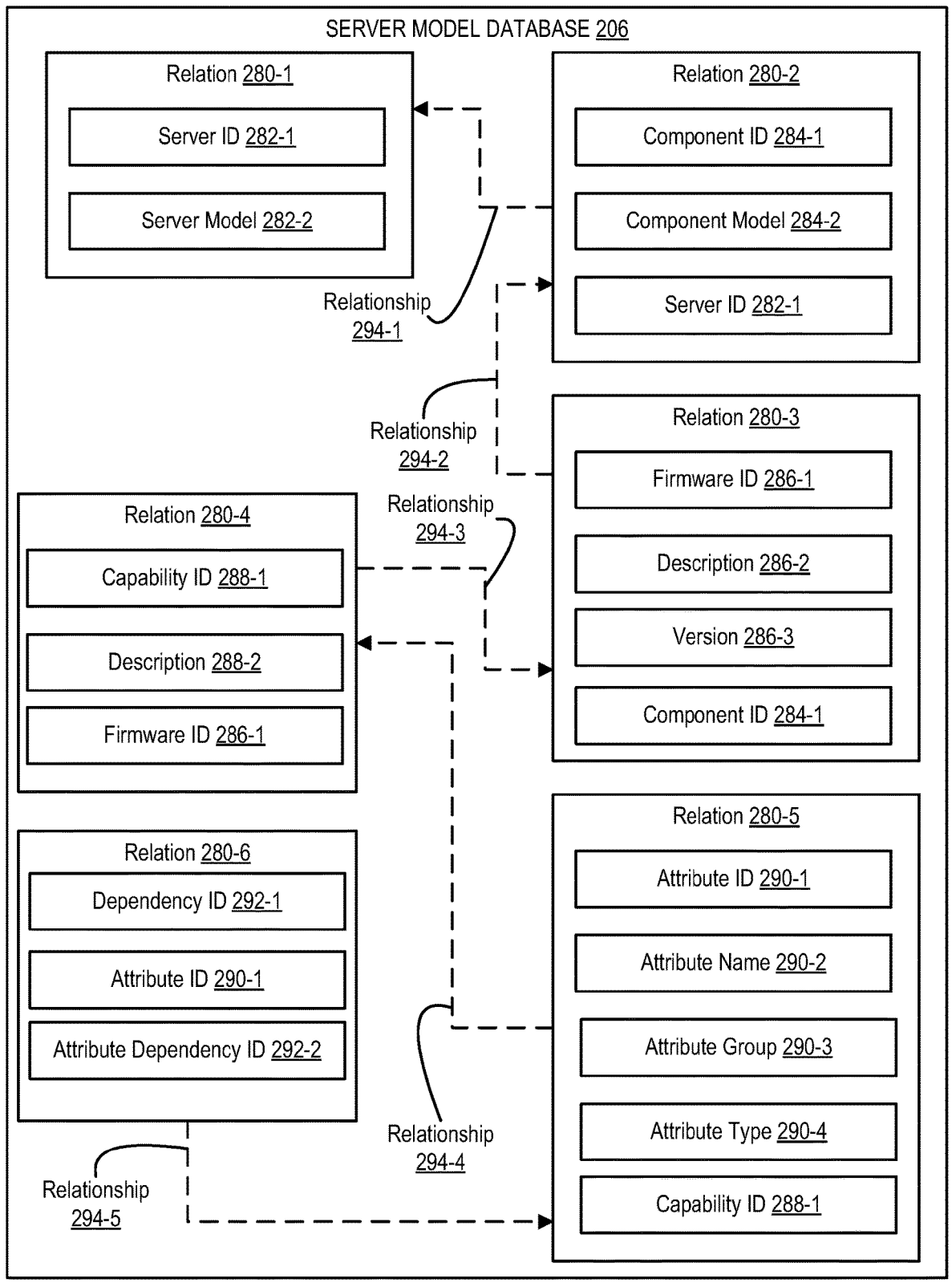
FIG. 2C illustrates examples of relations of a server model database, according to one or more embodiments.

In one or more embodiments, server model database 206-1 may include relations 280, as illustrated in FIG. 2C. In one example, a relation 280-1 may include metadata 282. In one instance, server ID 282-1 may be utilized to store a server ID associated with a managed system 250. In another instance, server model 282-2 may utilized to store server model information associated with a managed system 250. In a second example, a relation 280-2 may include metadata 284 and 282-1. In one instance, a component ID 284-1 may be utilized to store a component ID associated with a component 222. In a second instance, component model 284-2 may be utilized to store component model information associated with a component 222. In another instance, server ID 282-1 may be utilized to store a server ID associated with a managed system 250 that includes component 222. If component 222 is not installed in a managed system 250, server ID 282-1 may be utilized to store a "null" value.

In a third example, a relation 280-3 may include metadata 286 and 284-1. In one instance, a firmware ID 286-1 may be utilized to store a firmware ID associated with firmware 224. In a second instance, a description 286-2 may be utilized to store description information associated with firmware 224. In a third instance, version 286-3 may be utilized to store version information associated with firmware 224. In another instance, component ID 284-1 may be utilized to store a component ID associated with firmware 224. In a fourth example, a relation 280-4 may include metadata 288 and 286-1. In one instance, a capability ID 288-1 may be utilized to store a capability ID associated with a capability 226. In a second instance, a description 288-2 may be utilized to store description information associated with capability 226. In another instance, firmware ID 286-1 may be utilized to store a firmware ID associated with capability 226.

In a fifth example, a relation 280-5 may include metadata 290 and 288-1. In one instance, an attribute ID 290-1 may be utilized to store an attribute ID associated with an attribute 228. In a second instance, an attribute name 290-2 may be utilized to store name information associated with attribute 228. In a third instance, an attribute group 290-3 may be utilized to store attribute group information associated with attribute 228. In a fourth instance, an attribute type 290-4 may be utilized to store attribute type information associated with attribute 228. In another instance, capability ID 288-1 may be utilized to store a capability ID associated with attribute 228. In another example, a relation 280-6 may include metadata 292-1, 292-2, and 292. In one instance, a dependency ID 292-1 may be utilized to store an dependency ID associated with a dependency. In a second instance, an attribute ID 290-1 may be utilized to store an attribute ID associated with an attribute 228. In another instance, an attribute dependency ID 292-2 may be utilized to store an attribute ID associated with another attribute 228.

In one or more embodiments, relations 280 may be related via relationships 294. In one example, relation 280-6 may be related to relation 280-5 via a relationship 294-5. In one instance, relation 280-6 may be related to relation 280-5 via attribute ID 290-1. In another instance, relation 280-6 may be related to relation 280-5 via attribute dependency ID 292. In a second example, relation 280-5 may be related to relation 280-4 via a relationship 294-4. For instance, relation 280-5 may be related to relation 280-4 via capability ID 288-1. In a third example, relation 280-4 may be related to relation 280-3 via a relationship 294-3. For instance, relation 280-4 may be related to relation 280-3 via firmware ID 286-1. In a fourth example, relation 280-3 may be related to relation 280-2 via a relationship 294-2. For instance, relation 280-3 may be related to relation 280-2 via component ID 284-1. In another example, relation 280-2 may be related to relation 280-1 via a relationship 294-1. For instance, relation 280-2 may be related to relation 280-1 via server ID 282-1. In one or more embodiments, relations 280 may be utilized to describe tables in a database. For example, metadata associated with respective relations 280 may be utilized to describe columns of the tables of the database.

In one or more embodiments, relationships 294 may utilize and/or be implemented via foreign keys. In one example, attributed ID 290-1 of relation 280-6 may be a foreign key of relation 280-6. For instance, attributed ID 290-1 of relation 280-6 may be utilized to match a record and/or a tuple of relation 280-6 to a record and/or a tuple of relation 280-5. In a second example, capability ID 288-1 of relation 280-5 may be a foreign key of relation 280-5. For instance, capability ID 288-1 of relation 280-5 may be utilized to match a record and/or a tuple of relation 280-5 to a record and/or a tuple of relation 280-4. In a third example, firmware ID 286-1 of relation 280-4 may be a foreign key of relation 280-4. For instance, firmware ID 286-1 of relation 280-4 may be utilized to match a record and/or a tuple of relation 280-4 to a record and/or a tuple of relation 280-3. In a fourth example, component ID 284-1 of relation 280-3 may be a foreign key of relation 280-3. For instance, component ID 284-1 of relation 280-3 may be utilized to match a record and/or a tuple of relation 280-3 to a record and/or a tuple of relation 280-2. In another example, server ID 282-1 of relation 280-2 may be a foreign key of relation 280-2. For instance, server ID 282-1 of relation 280-2 may be utilized to match a record and/or a tuple of relation 280-2 to a record and/or a tuple of relation 280-1.

In one or more embodiments, searches may be performed on any one or more relations 280. For example, a search may be performed based on a capability 226. For instance, the search may utilize relation 280-4 and/or relationships 294 to determine one or more components associated with capability 226.

In one or more embodiments, a new component 222 may be received. For example, when a new component 222 is received, server model management system 204 may update server model database 206-1 by adding information associated with the new component 222. In one or more embodiments, server model management system 204 may update one or more of relations 280-1, 280-2, 280-3, 280-4, 280-5, and 280-6, among others. In one example, a record and/or a tuple of relation 280-2 may be created or updated with information associated with the new component 222. In a second example, a record and/or a tuple of relation 280-3 may be created or updated with information associated with the new component 222. In a third example, a record and/or a tuple of relation 280-4 may be created or updated with information associated with the new component 222. In a fourth example, a record and/or a tuple of relation 280-5 may be created or updated with information associated with the new component 222. In another example, one or more records and/or tuples of relation 280-6 may be created or updated with information associated with the new component 222.

In one or more embodiments, during operation of server management system 202, server profile creation module 214 may fetch incremental updates associated with one or more of relations 280-1, 280-2, 280-3, 280-4, 280-5, and 280-6, among others, of server model database 206-1 from server model management system 204. For example, server profile creation module 214 may fetch incremental updates associated with one or more of relations 280-1, 280-2, 280-3, 280-4, 280-5, and 280-6, among others, of server model database 206-1 from server model management system 204 and store the incremental updates associated with one or more of relations 280-1, 280-2, 280-3, 280-4, 280-5, and 280-6, among others, via server model database 206-2. In one or more embodiments, server profile creation module 214 may receive solution provisions 240. For example, solution provisions 240 may include information associated with one or more hardware components, information associated with one or more one or more capabilities, and/or information associated with one or more one or more attributes, among others.

In one or more embodiments, solution provisions 240 may be determined from and/or created from a solution specification 238. For example, solution specification 238 may include one or more requirements, one or more specifications, and /or one or more instructions that may be utilized in creating a server solution. In one instance, a server solution may be or include a VSAN. In a second instance, a server solution may be or include a ScaleIO. In another instance, a server solution may be or include a HA cluster. In one or more embodiments, a server solution may be associated with a configuration. For example, a configuration may include a disposition and/or an arrangement of components. In one or more embodiments, a configuration associated with a server solution may include a minimum number of storage devices, a type of storage device, an arrangement of storage devices (e.g., a RAID), a RAID level, a minimum number of network interfaces, a minimum number of network ports, a minimum number of network ports per network interface, a network interface partitioning capability, and a network interface quality of service (QoS) capability, among others. In one or more embodiments, one or more managed systems 250 may be utilized in implementing a server solution. In one example, one or more managed systems 250 may not be reconfigured in implementing a server solution. In another example, one or more managed systems 250 may be configured or reconfigured in implementing a server solution.

In one or more embodiments, solution provisions 240 may be received via a user interface (UI). For example, the user interface may be or include a graphical user interface (GUI). In one or more embodiments, solution provisions 240 may be received via a file. For example, the file may be formatted according to a data description language. In one instance, the file may be or include data formatted via an Extensible Markup Language (XML). In a second instance, the file may be or include data formatted via a JavaScript Object Notation (JSON). In another instance, the file may be or include data formatted via a YAML (YAML Ain't Markup Language).

Figure 2D:
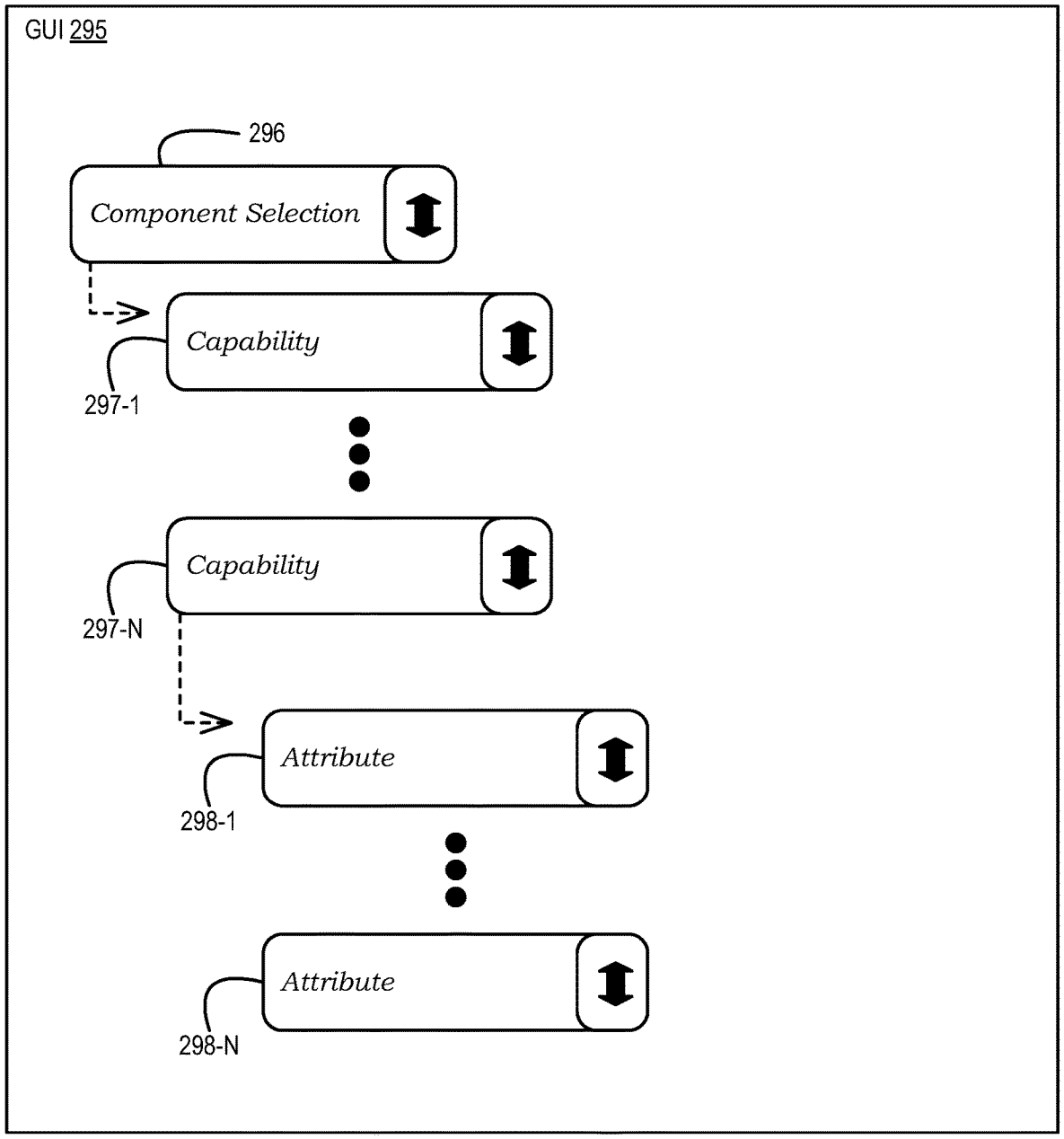
FIG. 2D illustrates an example of a graphical user interface, according to one or more embodiments.

In one or more embodiments, server profile creation module 214 may provide a GUI 295, illustrated in FIG. 2D. For example, solution provisions 240 may be obtained via GUI 295. For instance, GUI 295 may include GUI widgets that may be utilized in providing and/or obtaining information associated with solution provisions 240. In one or more embodiments, a component selection element 296 may be provided. For example, component selection element 296 may be or include a drop down menu item that includes information indicating and/or associated with one or more components 222. For instance, one or more records and/or tuples associated with relation 280-2 may be associated with one or more items of component selection element 296. In one or more embodiments, one or more capability selection elements 297 may be provided. For example, the one or more capability selection elements 297 may be based at least on a selection of a component from component selection element 296. For instance, the one or more capability selection elements 297 may be dynamically created based at least on the component from component selection element 296. In one or more embodiments, basing the one or more capability selection elements 297 at least on component selection element 296 may provide guidance to a user of GUI 295. In one or more embodiments, GUI 295 may be or include a native program and/or application. In one or more embodiments, GUI 295 may be or include a web-based application. For example, GUI 295 may be provided via a web browser. For instance, server profile creation module 214 may be or include a web server.

In one or more embodiments, one or more attribute selection elements 298 may be provided. For example, the one or more attribute selection elements 298 may be based at least on a selection of a capability selection element 297. For instance, the one or more attribute selection elements 298 may be dynamically created based at least on the capability selection element 297. In one or more embodiments, basing the one or more attribute selection elements 298 at least on a selection of a capability selection element 297 may provide guidance to a user of GUI 295. In one or more embodiments, an attribute selection element 298 may be or include a drop-down menu item that includes information indicating and/or associated with one or more attributes of a capability 226. For example, one or more records and/or tuples associated with relation 280-5 may be associated with one or more items of attribute selection element 298.

In one or more embodiments, server profile creation module 214 may select from data associated with one or more of 280-1, 280-2, 280-3, 280-4, 280-5, and 280-6, among others, based at least on solution provisions 240. In one or more embodiments, server profile creation module 214 may select from a set of components 222, which may be based on solution provisions 240. For example, server profile creation module 214 may select matching criteria based at least on solution provisions 240. For instance, server profile creation module 214 may determine and/or create a desired server profile 242 based at least on solution provisions 240.

In one or more embodiments, server profile creation module 214 may select from a set of capabilities 226 of a component 222 of the selected set of components 222 a set of capabilities 226, which may be based at least on solution provisions 240. In one or more embodiments, server profile creation module 214 may select from a set of attributes 228 of a capability 226 of the selected set of capabilities 226, which may be based on solution provisions 240. In one or more embodiments, server profile creation module 214 may enter a set of configuration values and/or configuration settings for the selected set of attributes 228 based at least on guidance from solution provisions 240 and/or user input. For example, the user input may be received via GUI 295. In one or more embodiments, server profile creation module 214 may select matching criteria based at least on solution provisions 240. For example, the matching criteria may indicate the type of matching criteria to be used including mandatory match server model criteria, solution based component match model criteria, or instance based attribute match criteria, among others. In one or more embodiments, server profile creation module 214 may create desired server profile 242 based at least on the selected set of components 222, the selected set of capabilities 226, the selected set of configuration attributes 228, the entered set of configuration values and/or configuration settings for the selected set of attributes 228, and/or the selected matching criteria based at least on solution provisions 240, among others.

In one or more embodiments, solution compliance module 216 may perform a compliance process and/or a configuration process to determine if desired server profile 242 including a set of supported components 222 is compliant with a server model 220. For example, solution compliance module 216 may perform a capability match to identify a first supported component 222 of the set of supported components 222 of desired server profile 242 having a first set of required capabilities 226 of a first required component 222 of the set of required components 222 based at least on a first set of supported capabilities 226 of the first supported component 222.

In one or more embodiments, if the identification of the first supported component 222 was unsuccessful, solution compliance module 216 may identify a second supported component 222 of the set of supported components 222 including a subset of the first set of required capabilities 226 having a second number of required capabilities that is greater than or equal to each respective number of required capabilities in a respective subset of the first set of required capabilities 226 in each of the other supported components 222 of the set of supported components 222. For example, the identified second supported component 222 may have the most required capabilities 226 of any of the other supported components 222. In one or more embodiments, server model database 206 may be merged and correlated with cost data associated with each component 222. When server model repository 206-2 is updated with the latest information from server model database 206-1, server model database 206-1 may also include the cost data associated with each component 222. In one or more embodiments, the identification of the second supported component 222 may be further based on the cost data associated with each component 222. For example, by identifying the second supported component 226 based on the number of required capabilities that each supported component 226 has and the cost data associated with each component 222, one or more different supported components 226 may be selected to resolve the capability mismatch and the non-compliance issues. For example, the second supported component 222 may have the highest number of required capabilities but may be too expensive to bring in to compliance by replacing this component. However, for instance, when the cost data is factored in, two lesser expensive supported components 222 may be replaced at a lower cost to resolve the mismatch and non-compliance issues. The identification of the second support component 222 may also be based on other factors associated with each component 222 of the set of supported components 222 resulting in a better and/or less expensive resolution.

In one or more embodiments, solution compliance module 216 may, when the identification of the first supported component 222 was unsuccessful, report a capability mismatch of each respective set of supported capabilities 226 of each supported component 222 of the set of supported components 222 against the first set of required capabilities 226 of the first required component 222 based on the identification of the second supported component 222. Solution compliance module 216 may provide a set of capability dependencies of the second supported component 222 to bring the second supported component 222 into compliance with the first set of required capabilities of the first required component 222. Solution compliance module 216 may also provide a set of capable components 222 having the set of required capabilities to resolve the capabilities mismatch.

In one or more embodiments, when the identification of the first supported component 222 was successful, solution compliance module 216 may identify a first supported attribute 228 of a set of supported attributes 228 of the first set of supported capabilities 226 that matches a first required attribute 228 of the first required capabilities 226. In one or more embodiments, when the identification of the first supported attribute 228 is unsuccessful, solution compliance module 216 may provide a set of attribute dependencies to bring the first supported attribute 228 into compliance with the first required attribute 228 of the of the first required capabilities 226. In one or more embodiments, during a deployment process, solution compliance module 216 may utilize the provided inter-attribute dependencies while performing configuration of the first supported component 222.

In one or more embodiments, a configuration deployment module 218 may deploy desired server profile 242 to one or more of managed systems 250, illustrated in FIG. 2B. As illustrated in FIG. 2B, a managed system 250 may include a server model database 260, a current configuration 262, a server profile deployment module 264, a server profile extraction module 266, a current server profile 268, and a prospective server profile 270. In one example, server model database 260 may include information associated with one or more components and/or one or more configurations of one or more components of managed system 250. In a second example, current configuration 262 may store information associated with a current configuration of managed system 250. In a third example, server profile deployment module 264 may receive configuration information and/or profile information from server management system 202. In one instance, server profile deployment module 264 may receive configuration information and/or profile information from configuration deployment module 218. In another instance, server profile deployment module 264 may receive prospective server profile 270 from configuration deployment module 218. In a fourth example, server profile extraction module 266 may determine and/or extract a profile of managed system 250. For instance, server profile extraction module 266 may determine and/or extract current configuration 262. In another example, prospective server profile 270 may be utilized to configure and/or reconfigure managed system 250. For instance, server profile deployment module 264 may utilize prospective server profile 270 to configure and/or reconfigure managed system 250.

Figure 3:
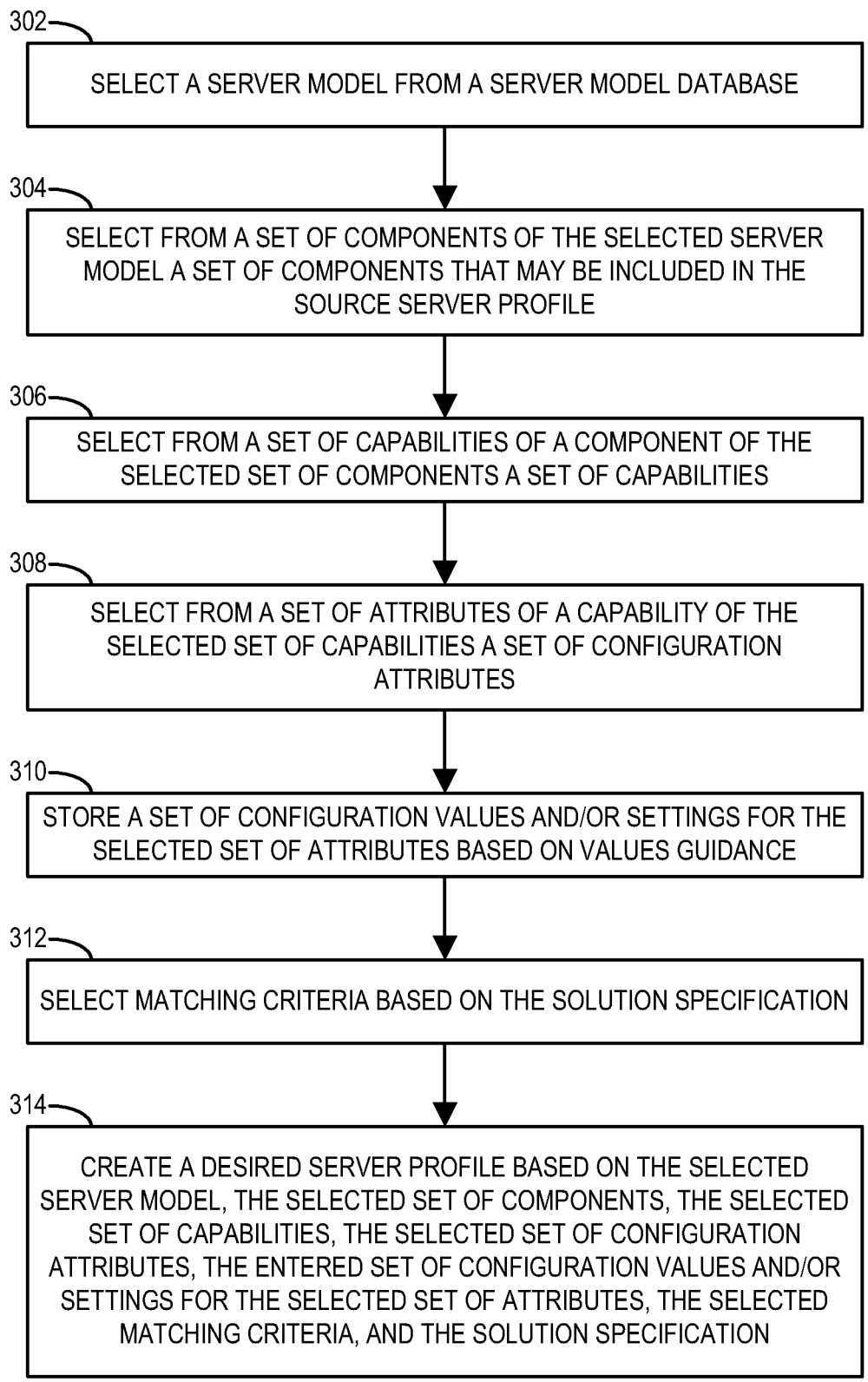
FIG. 3 illustrates an example of a method of server profile creation, according to one or more embodiments.

Turning now to FIG. 3, an example of a method of server profile creation is illustrated, according to one or more embodiments. In one or more embodiments, server profile creation module 214 may utilize information of server model database 206 including metadata and relationship information and present guided choices for server profile creation. At 302, a server model 220 may be selected from server model database 206. At 304, a set of components may be selected from components associated with server model 220. For example, a set of components may be selected from components associated with server model 220 based at least on solution provisions 240. At 306, a set of capabilities may be selected from capabilities associated with the selected set of components. For example, the set of capabilities may be selected from capabilities associated with the selected set of components based at least on solution provisions 240. At 308, a set of configuration attributes may be selected from one or more attributes associated with the set of selected capabilities. For example, the set of attributes may be selected from the one or more attributes associated with the set of selected capabilities based at least on solution provisions 240. At 310, a set of configuration values and/or settings for the selected set of attributes 228 may be stored. At 312, matching criteria based at least on solution provisions 240 may be selected. In one or more embodiments, the matching criteria may indicate the type of matching criteria to be used including mandatory match server model criteria, solution based component match model criteria, or instance based attribute match criteria. At 314, a desired server profile may be created. For example, desired server profile 242 may be created. For instance, desired server profile 242 may be created based at least on the selected server model 220, the selected set of components, the selected set of capabilities, the selected set of configuration attributes, the stored set of configuration values and/or settings for the selected set of attributes, the selected matching criteria, and solution provisions 240, among others.

Figure 4:
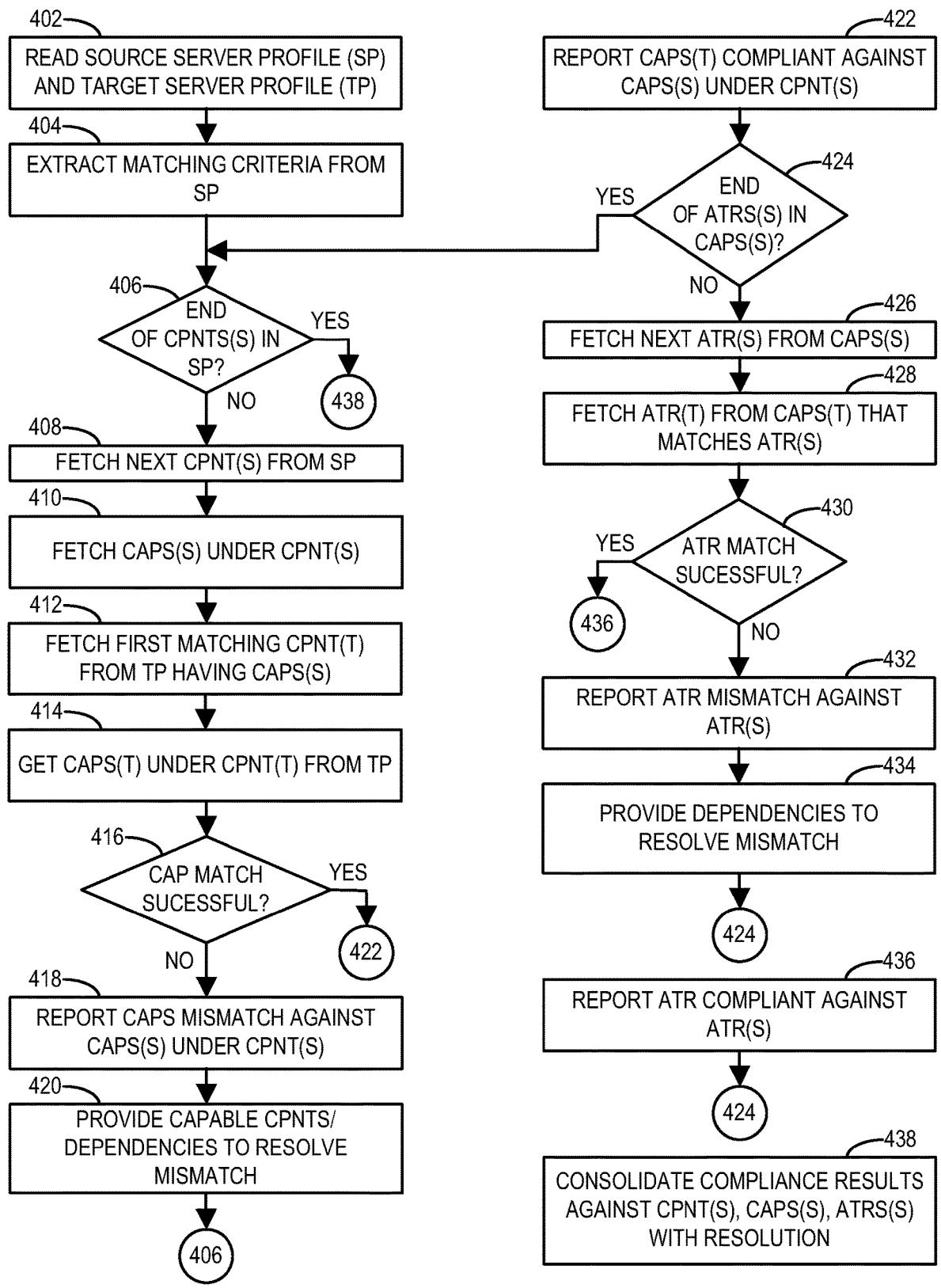
FIG. 4 illustrates an example of a method to perform solution aware server compliance and configuration solution based matching via a server management system, according to one or more embodiments.

Turning now to FIG. 4, an example of a method to perform solution aware server compliance and configuration solution based matching via a server management system is illustrated, according to one or more embodiments. At 402, a source server profile (SP) and a target server profile (TP) may be read by solution compliance module 216. In one example, the SP may be or include a server model 220. In another example, the TP may be or include a desired server profile 242. At 404, a matching criteria from the SP may be extracted by solution compliance module 216. In one or more embodiments, the matching criteria from the SP may be solution-based component match model criteria. At 406, solution compliance module 216 may determine if the end of the set of required components 222 has been reached. When the end of the set of required components 222 has been reached, the method may proceed to 438. Otherwise, the method may proceed to 408. At step 408, solution compliance module 216 may fetch a next required component 222 from the SP. At 410, solution compliance module 216 may fetch the set of required capabilities 224 under the required component 222.

At 412, solution compliance module 216 may fetch first matching supported component 222 from the TP having the set of required capabilities 224. At 414, solution compliance module 216 may get the set of supported capabilities 224 under the first matching supported component 222 from the TP. At 416, solution compliance module 216 may determine if the first matching supported component 222 capabilities match against the set of required capabilities 224. When the first matching supported component 222 capabilities match against the set of required capabilities 224, the method may proceed to 422. Otherwise, the method may proceed to 418. At step 418, solution compliance module 216 may report a capabilities mismatch against the set of required capabilities under the required component 422.

At 420, solution compliance module 216 may provide a set of capable components 222 having the set of required capabilities to resolve the capabilities mismatch and may provide a set of dependencies of the first matching supported component 222 to bring the first matching supported component 222 into compliance with the set of required capabilities of the required component 222. At 422, solution compliance module 216 may report the set of supported capabilities of the first matching supported component 222 is compliant against the set of required capabilities of the required component 222. At 424, it may be determined if the end of the set of required attributes in the set of required capabilities has been reached. When the end of the set of required attributes in the set of required capabilities has been reached, the method may proceed to step 406. Otherwise the method may proceed to 426.

At 426, solution compliance module 216 may fetch a next required attribute 228 from the set of required capabilities 226. At 428, solution compliance module 216 may fetch the support attribute 228 from the set of supported capabilities 226 that matches required attribute 228. At 430, solution compliance module 216 may determine if the attribute match was successful. When the attribute match was successful, the method may proceed to 436. Otherwise, the method may proceed to 432. At 432, solution compliance module 216 may report an attributes mismatch against required attribute 428. At 434, solution compliance module 216 may provide a set of attribute dependencies to resolve the mismatch. At 436, solution compliance module 216 may report the supported attribute 228 is compliant against the required attribute 228. At 438, solution compliance module 216 may consolidate compliance results against required component 222, required capabilities 226, the required set of attributes 228, with each provided resolution to bring the SP into compliance with the TP.

Figure 5:
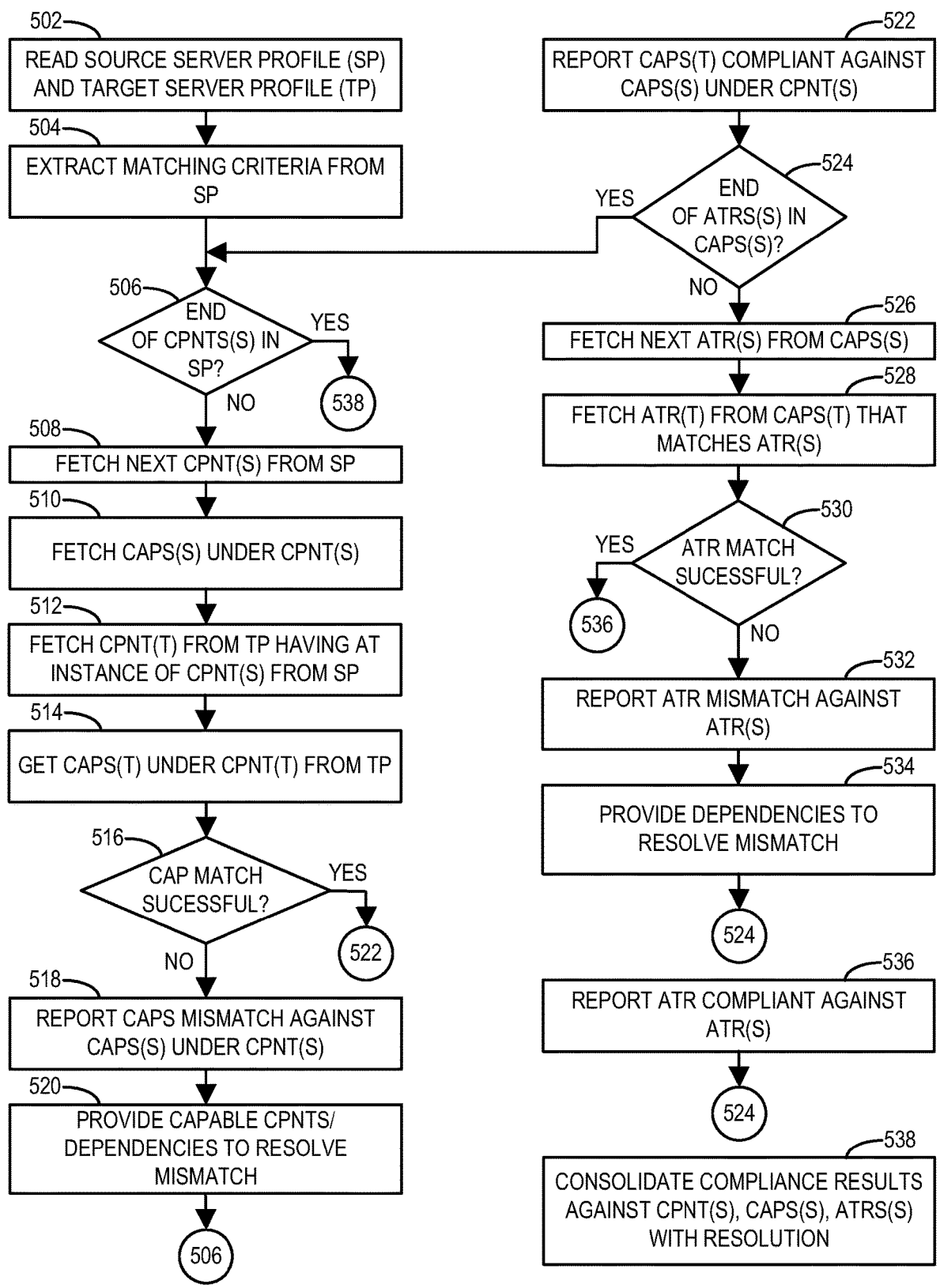
FIG. 5 illustrates an example of a method to perform solution aware server compliance and configuration instance based matching via a server management system, according to one or more embodiments.

Turning now to FIG. 5, an example of a method to perform solution aware server compliance and configuration instance based matching via a server management system is illustrated, according to one or more embodiments. At 502, solution compliance module 216 may read a source server profile (SP) and a target server profile (TP). In one example, the SP may be or include a server model 220. In another example, the TP may be or include a desired server profile 242. At 504, solution compliance module 216 may extract matching criteria from the SP. In one or more embodiments, the matching criteria from the SP may be instance based matching criteria. At 506, solution compliance module 216 may determine if the end of the set of required components 222 has been reached. When the end of the set of required components 222 has been reached, the method may proceed to 538. Otherwise, the method may proceed to step 508.

At step 508, solution compliance module 216 may fetch a next required component 222 from the SP. At 510, solution compliance module 216 may fetch the set of required capabilities 224 under the required component 222. At 512, solution compliance module 216 may fetch supported component 222 from the TP having at instance of the required component 222 from the SP. At 514, solution compliance module 216 may get the set of supported capabilities 224 under the first matching supported component 222 from the TP. At 516, by solution compliance module 216 may determine if the first matching supported component 222 capabilities match against the set of required capabilities 224. When the first matching supported component 222 capabilities match against the set of required capabilities 224, the method may proceed to 522. Otherwise, the method may proceed to 518.

At 518, solution compliance module 216 may report a capabilities mismatch against the set of required capabilities under the required component 522. At 520, solution compliance module 216 may provide a set of capable components 222 having the set of required capabilities to resolve the capabilities mismatch and provide a set of dependencies of the first matching supported component 222 to bring the first matching supported component 222 into compliance with the set of required capabilities of the required component 222. At 522, solution compliance module 216 may report the set of supported capabilities of the first matching supported component 222 is compliant against the set of required capabilities of the required component 222. At 524, it may be determined if the end of the set of required attributes in the set of required capabilities has been reached. When the end of the set of required attributes in the set of required capabilities has been reached, the method may proceed to 506. Otherwise the method may proceed to 526.

At 526, solution compliance module 216 may fetch a next required attribute 228 from the set of required capabilities 226. At 528, solution compliance module 216 may fetch the support attribute 228 from the set of supported capabilities 226 that matches required attribute 228. At 530, solution compliance module 216 may determine if the attribute match was successful. When the attribute match was successful, the method may proceed to 536. Otherwise, the method may proceed to 532. At 532, solution compliance module 216 may report an attributes mismatch against required attribute 528. At 534, solution compliance module 216 may provide a set of attribute dependencies to resolve the mismatch. At 536, solution compliance module 216 may report the supported attribute 228 is compliant against the required attribute 528. At 538, solution compliance module 216 may consolidate compliance results against required component 222, required capabilities 226, the required set of attributes 228, with each provided resolution to bring the SP into compliance with the TP.

Figure 6:
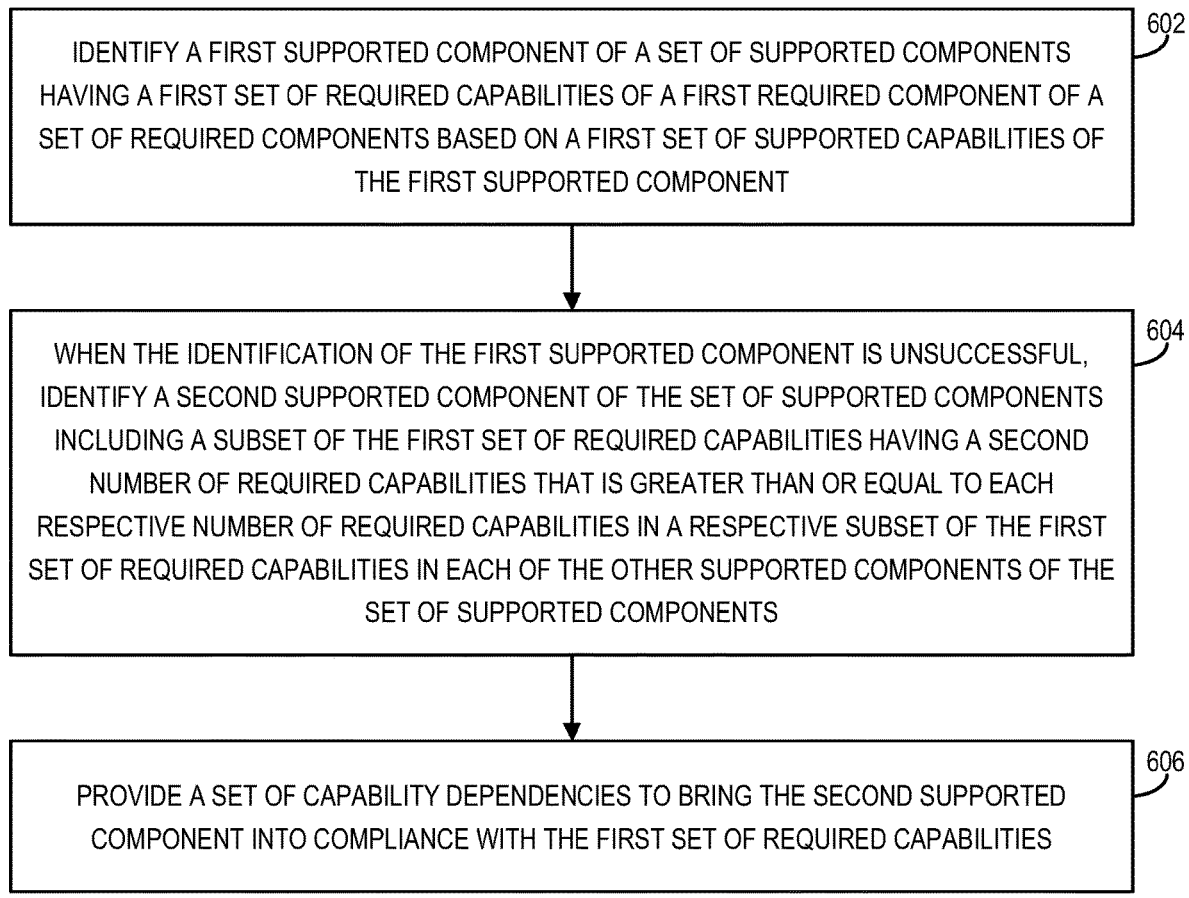
FIG. 6 illustrates an example of a method to perform solution aware server compliance and configuration in a server management system, according to one or more embodiments.

Turning now to FIG. 6, an example of a method to perform solution aware server compliance and configuration in a server management system is illustrated, according to one or more embodiments. At 602, a first supported component of a set of supported components having a first set of required capabilities of a first required component of a set of required components based on a first set of supported capabilities of the first supported component may be identified. In one or more embodiments, the set of supported components may be included in a target server profile that may be stored in the memory. In one or more embodiments, the set of required components may be included in a source server profile that may be stored in the memory. At 604, when identifying the first supported component is unsuccessful, a second supported component of the set of supported components including a subset of the first set of required capabilities having a second number of required capabilities that is greater than or equal to each respective number of required capabilities in a respective subset of the first set of required capabilities in each of the other supported components of the set of supported components may be identified. At 606, a set of capability dependencies to bring the second supported component into compliance with the first set of required capabilities may be provided.

Figure 7A:
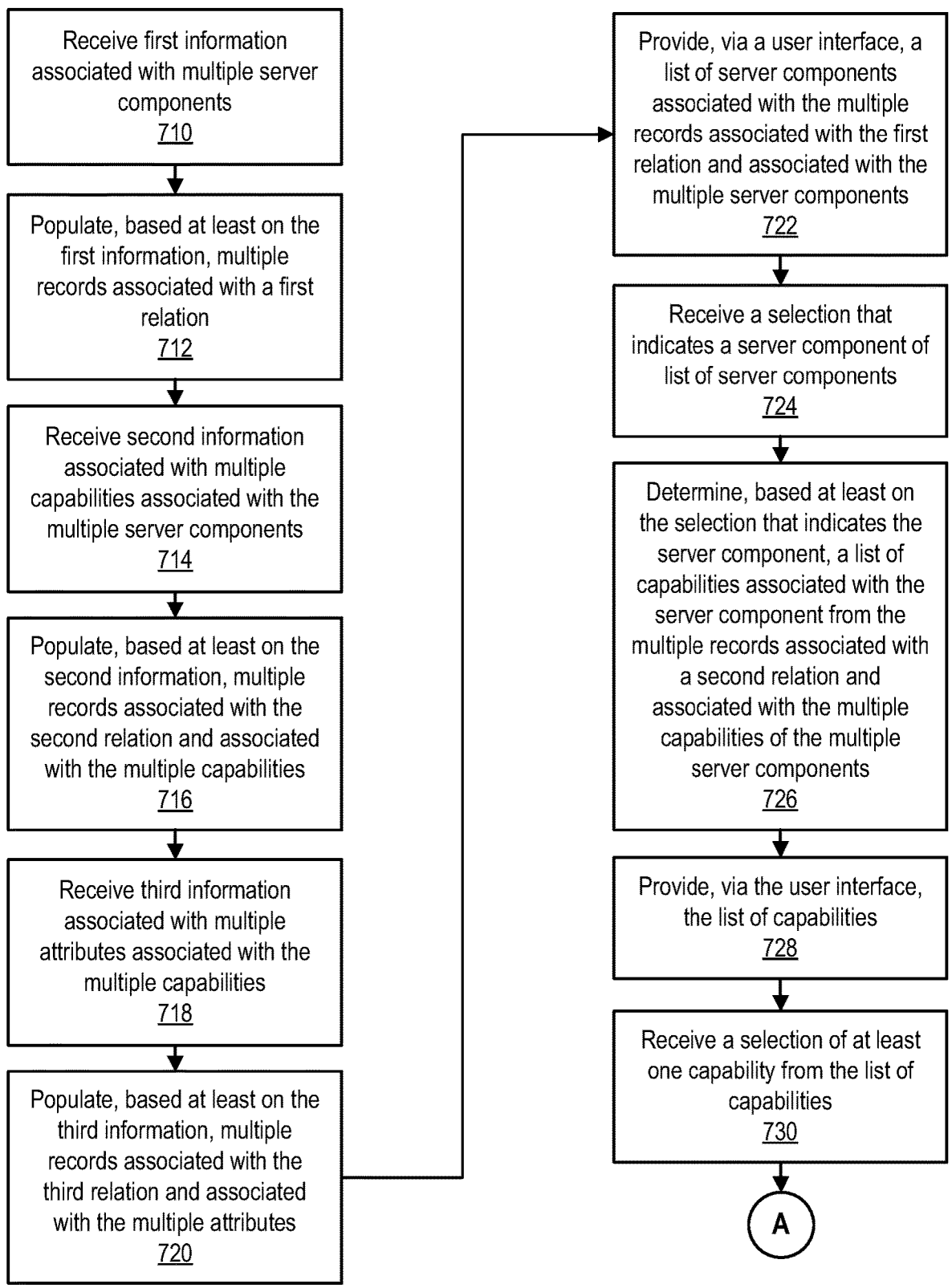
FIGS. 7A-7C illustrate an example of a method of utilizing one or more information handling systems, according to one or more embodiments.
Figure 7B:
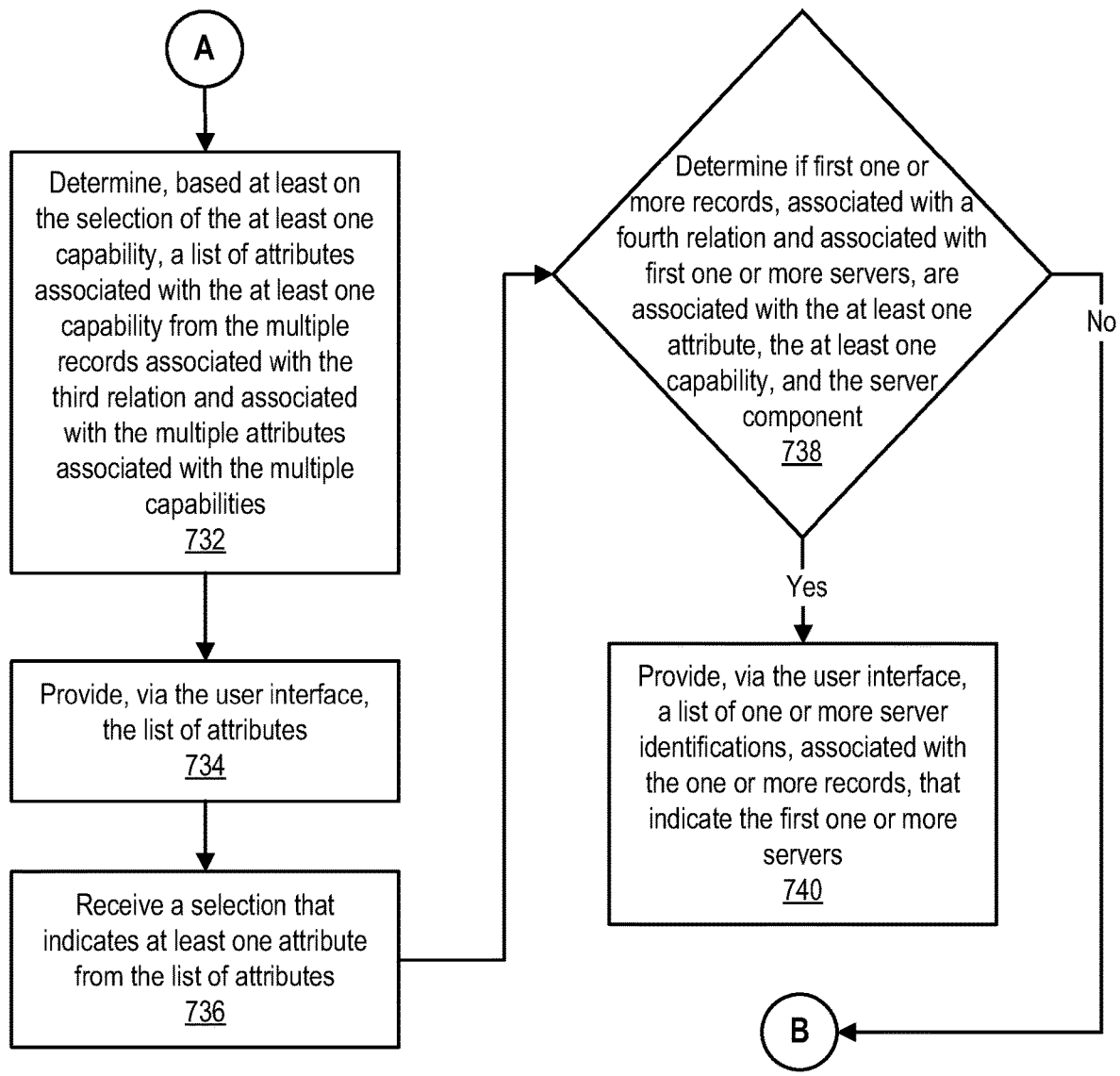
Figure 7C:
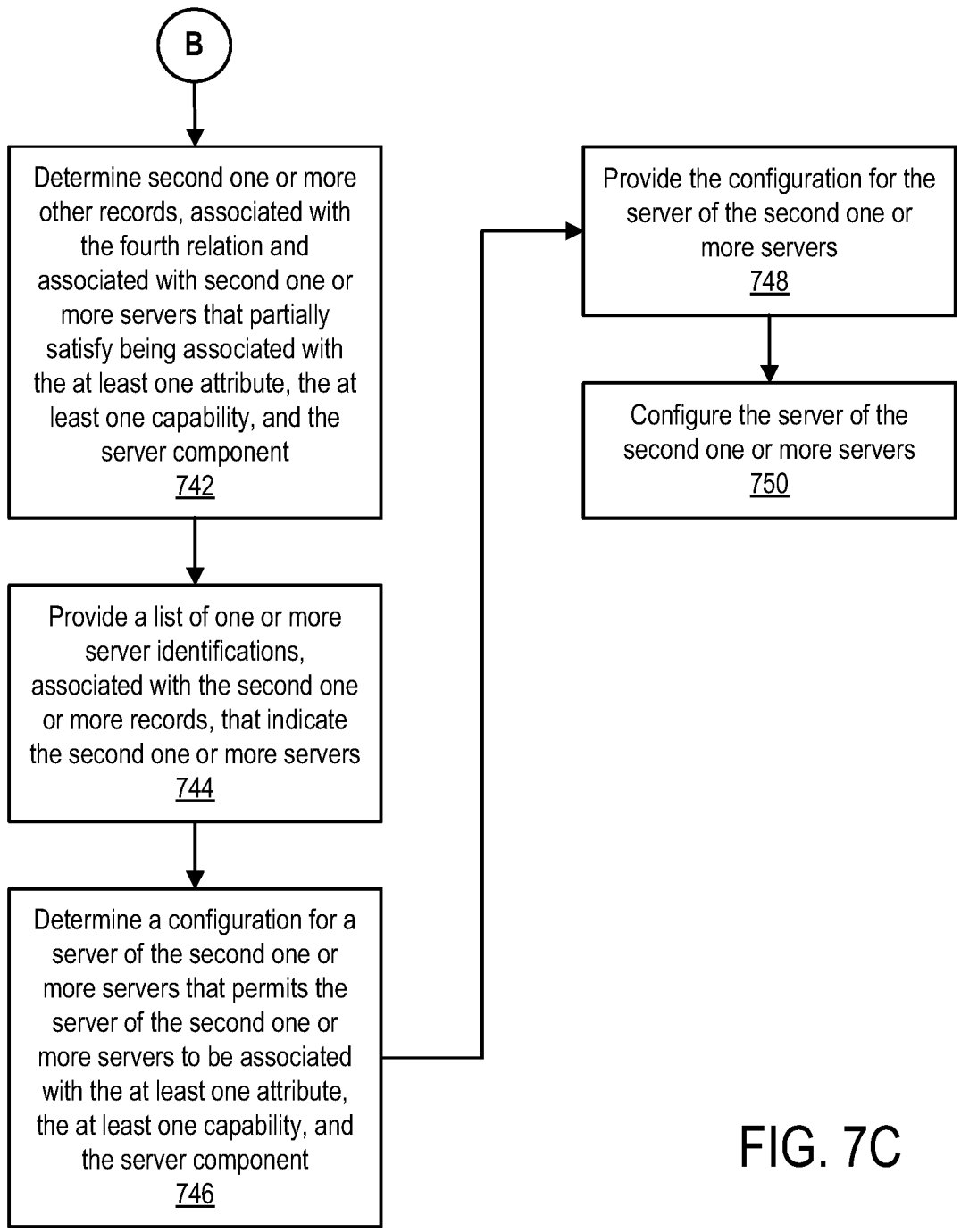

Turning now to FIGS. 7A-7C, an example of a method of utilizing one or more information handling systems is illustrated, according to one or more embodiments. At 710, first information associated with multiple of server components may be received. For example, first information associated with server components 222 may be received. For instance, server model management system 204 may receive the first information associated with server components 222. At 712, multiple records associated with a first relation and the multiple server components may be populated based at least on the first information. For example, server model management system 204 may populate records 812 (illustrated in FIG. 8A) based at least on the first information and based at least on relation 280-2.

At 714, second information associated with multiple capabilities associated with the multiple server components may be received. For example, second information associated with capabilities 226 may be received. For instance, server model management system 204 may receive the second information associated with capabilities 226 associated with server components 222. At 716, multiple records associated with the second relation and associated with the multiple capabilities may be populated based at least on the second information. For example, server model management system 204 may populate records 816 (illustrated in FIG. 8B) based at least on the second information and based at least on relation 280-4.

At 718, third information associated with multiple attributes associated with the multiple capabilities may be received. For example, third information associated with attributes 228 may be received. For instance, server model management system 204 may receive the third information associated with attributes 228 associated with capabilities 226. At 720, multiple records associated with the third relation and associated with the multiple attributes may be populated. For example, server model management system 204 may populate records 818 (illustrated in FIG. 8C) based at least on the third information and based at least on relation 280-5.

At 722, a list of server components associated with the multiple records associated with the first relation and associated with the multiple server components may be provided via a user interface. For example, a list of server components associated with the multiple records associated with the first relation and associated with the multiple server components may be provided via GUI 295. For instance, the list of server components may be provided via drop down menu 296. In one or more embodiments, server management system 202 may provide the list of server components via the user interface. At 724, a selection that indicates a server component of list of server components may be received. For example, server management system 202 may receive a selection that indicates a server component of list of server components. For instance, receiving the selection that indicates the server component of list of server components may include receiving a selection via down menu 296.

At 726, a list of capabilities associated with the server component from the multiple records associated with the second relation and associated with the multiple capabilities of the multiple server components may be determined based at least on the selection that indicates the server component. For example, server management system 202 may determine a list of capabilities associated with the server component from the multiple records associated with the second relation and associated with the multiple capabilities of the multiple server components. In one or more embodiments, determining, based at least on the selection that indicates the server component, the list of capabilities associated with the server component from the multiple records associated with the second relation and associated with the multiple capabilities of the multiple server components may include utilizing a first relationship associated with at least one of the first relation and the second relation, where the first relationship is based at least on a foreign key of the second relation. For example, the first relationship may be or include relationship 294-3. For instance, the foreign key of the second relation may be or include firmware ID 286-1.

At 728, the list of capabilities may be provided via the user interface. For example, server management system 202 may the list of capabilities may be provided via the user interface. For instance, the list of capabilities may be provided via drop down menu 297. At 730, a selection that indicates at least one capability from the list of capabilities may be received. For example, server management system 202 may receive a selection that indicates at least one capability from the list of capabilities. For instance, receiving the selection that indicates the at least one capability from the list of capabilities may include receiving a selection via down menu 297.

At 732, a list of attributes associated with the at least one capability from the multiple records associated with the third relation and associated with the multiple attributes associated with the multiple capabilities may be determined. For example, server management system 202 may determine a list of attributes associated with the at least one capability from the multiple records associated with the third relation and associated with the multiple attributes associated with the multiple capabilities. In one or more embodiments, determining, based at least on the selection of the at least one capability, the list of attributes associated with the at least one capability from the multiple records associated with the third relation and associated with the multiple attributes associated with the multiple capabilities may include utilizing a second relationship between the second relation and the third relation, where the second relationship is based at least on a foreign key of the third relationship. For example, the second relationship may be or include relationship 294-4. For instance, the foreign key may be capability ID 288-1.

At 734, the list of attributes may be provided via the user interface. For example, server management system 202 may the list of attributes via the user interface. For instance, the list of attributes may be provided via drop down menu 298. At 736, a selection of at least one attribute from the list of attributes may be received. For example, server management system 202 may receive a selection that indicates at least one attribute from the list of attributes. For instance, receiving the selection that indicates the at least one attribute from the list of attributes may include receiving a selection via down menu 298.

At 738, it may be determined if first one or more records, associated with a fourth relation and associated with first one or more servers, are associated with the at least one attribute, the at least one capability, and the server component. For example, server management system 202 may determine if first one or more records, associated with a fourth relation and associated with first one or more servers, are associated with the at least one attribute, the at least one capability, and the server component. In one or more embodiments, the fourth relation may be or include relation 280-1. For example, the first one or more records may include one or more of records 810 (illustrated in FIG. 8A).

If the first one or more records, associated with the fourth relation and associated with the first one or more of servers, are associated with the at least one attribute, the at least one capability, and the server component, a list of one or more server identifications, associated with the one or more records, that indicate the first one or more servers may be provided via the user interface, at 740. For example, server management system 202 may provide a list of one or more server identifications, associated with the one or more records, that indicate the first one or more servers via the user interface.

If the first one or more records, associated with the fourth relation and associated with the multiple servers, are not associated with the at least one attribute, the at least one capability, and the server component, second one or more other records, associated with the fourth relation and associated with second one or more servers that partially satisfy being associated with the at least one attribute, the at least one capability, and the server component may be determined, at 742. For example, server management system 202 may determine second one or more other records, associated with the fourth relation and associated with second one or more servers that partially satisfy being associated with the at least one attribute, the at least one capability, and the server component.

At 744, a list of one or more server identifications, associated with the second one or more records, that indicate the second one or more servers may be provided. For example, For example, server management system 202 may provide a list of one or more server identifications, associated with the second one or more records, that indicate the second one or more servers. For instance, server management system 202 may provide the list of the one or more server identifications, associated with the second one or more records, that indicate the second one or more servers via the user interface. At 746, a configuration for a server of the second one or more servers that permits the server of the second one or more servers to be associated with the at least one attribute, the at least one capability, and the server component may be determined. For example, server management system 202 may determine a configuration for a server of the second one or more servers that permits the server of the second one or more servers to be associated with the at least one attribute, the at least one capability, and the server component.

At 748, the configuration for the server of the second one or more servers may be provided to the server of the second one or more servers. For example, server management system 202 may provide the configuration for the server of the second one or more servers to the server of the second one or more servers. In one or more embodiments, the configuration for the server of the second one or more servers may include one or more attributes, one or more attribute changes, one or more firmware upgrades, and/or one or more firmware changes, among others. In one or more embodiments, configuration deployment may include server management system 202 providing the configuration for the server of the second one or more servers to the server of the second one or more servers. In one or more embodiments, compliance remediation may include server management system 202 providing the configuration for the server of the second one or more servers to the server of the second one or more servers. In one or more embodiments, after the configuration for the server of the second one or more servers is provided to the server of the second one or more servers, the server of the second one or more servers may be configured to be at least a portion of a server solution.

At 750, the server of the second one or more servers may be configured. For example, the server of the second one or more servers may configure itself based at least on the configuration for the server of the second one or more servers. For example, server profile deployment module 264 may configure management system 250 based at least on the configuration for the server of the second one or more servers. In one or more embodiments, server profile deployment module 264 may upgrade and/or change firmware of a device of management system 250 based at least on the configuration for the server of the second one or more servers. In one example, a firmware of a network interface card may be upgraded. In another example, a firmware of a host bus adapter card may be changed. In one or more embodiments, after the server of the second one or more servers is configured, the server of the second one or more servers may be at least a portion of a server solution.

As shown in FIG. 8A, records 814 may be associated with relation 280-3. As illustrated in FIG. 8C, records 820 may be associated with relation 280-6. For example, record 820-2 may indicate that a first attribute associated with an attributed ID "789" may depend up a second attribute associated with an attributed ID "788". For instance, for a hard drive to have an attribute associated with "120 IOPS", the hard drive may depend on an attribute associated with "15K RPM".

As shown in FIG. 8A, components associated with component identifications (IDs) "103" and "555" may be associated with a server associated with a server ID "768". For example, records 812-2 and 812-4 may be associated with a record 810-5. For instance, the components associated with IDs "103" and "555" may be installed in a server (e.g., a managed system 250) associated with the server ID "768". As illustrated, a component associated with a component ID "540" may be associated with a server associated with a server ID "1568". For example, a record 812-3 may be associated with a record 810-3. For instance, the component associated with a component ID "540" may be installed in a server (e.g., a managed system 250) associated with the server ID "1568". As illustrated, a component associated with a component ID "102" may be associated with a server associated with a server ID "NULL". For example, the component associated with the component ID "102" may not be installed in a server (e.g., a managed system 250). In one instance, the component associated with the component ID "102" may be installed in a server (e.g., a managed system 250) at a later time. In another instance, the component associated with the component ID "102" may be installed in a server (e.g., a managed system 250) to configure the server to be included in a server solution.

As illustrated in FIG. 8A, records 814 may be associated with records 812 via respective component IDs. As shown in FIGS. 8A and 8B records 816 may be associated with records 814 via respective firmware IDs. In one or more embodiments, records 816 may be associated with records 812 via respective firmware IDs and respective component IDs. For example, capabilities of components may be associated with components via records 816, 814, and 812. As illustrated in FIG. 8C, records 818 may be associated with records 816 via respective capability IDs. For example, attributes associated be associated capabilities via records 818 and 816. In one or more embodiments, a record (e.g., a record 810, 812, 814, 816, 818, or 820) may be a tuple. For example a record may be a row in a table of a database. For instance, a relation 280 may be a schema of the table of the database.

In one or more embodiments, one or more of the method and/or process elements and/or one or more portions of a method and/or processor elements may be performed in varying orders, may be repeated, or may be omitted. Furthermore, additional, supplementary, and/or duplicated method and/or process elements may be implemented, instantiated, and/or performed as desired, according to one or more embodiments. Moreover, one or more of system elements may be omitted and/or additional system elements may be added as desired, according to one or more embodiments.

In one or more embodiments, a memory medium may be and/or may include an article of manufacture. For example, the article of manufacture may include and/or may be a software product and/or a program product. For instance, the memory medium may be coded and/or encoded with processor-executable instructions in accordance with one or more flowcharts, one or more systems, one or more methods, and/or one or more processes described herein to produce the article of manufacture.

The above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

What is claimed is:

1. An information handling system, comprising:
   at least one processor; and
   a memory medium, coupled to the at least one processor, that stores instructions executable by the at least one processor, which when executed by the at least one processor, cause the information handling system to:

provide, via a user interface, a list of server components associated with a first plurality of records, the first plurality of records associated with a first relation, the list of server components listing a plurality of server components;

receive, via the user interface, a selection that indicates a server component of the list of server components listing the plurality of server components;

determine, based at least on the selection that indicates the server component, a list of capabilities associated with the server component from a second plurality of records, the second plurality of records associated with a second relation, the list of capabilities listing a plurality of capabilities associated with the server component;

provide, via the user interface, the list of capabilities listing the plurality of capabilities associated with the server component;

receive, via the user interface, a selection of at least one capability from the list of capabilities;

determine, based at least on the selection of the at least one capability, a list of attributes associated with the at least one capability from a third plurality of records associated with a third relation, the list of attributes listing a plurality of attributes associated with the plurality of capabilities;

provide, via the user interface, the list of attributes listing the plurality of attributes associated with the plurality of capabilities;

receive, via the user interface, a selection of at least one attribute from the list of attributes;

determine if first one or more records are associated with the at least one attribute, the at least one capability, and the server component, the first one or more records associated with a fourth relation and a first one or more servers;

if the first one or more records are associated with the at least one attribute, the at least one capability, and the server component:
      provide, via the user interface, a first list of one or more server identifications that indicates the first one or more servers, the first list of one or more server identifications associated with the first one or more records; and if the first one or more records are not associated with the at least one attribute, the at least one capability, and the server component:
      determine second one or more records associated with the at least one attribute, the at least one capability, and the server component, the second one or more records associated with the fourth relation and a second one or more servers; and
      provide a second list of one or more server identifications that indicates the second one or more servers, the second list of one or more server identifications associated with the second one or more records.

2. The information handling system of claim 1, wherein, to determine, based at least on the selection that indicates the server component, the list of capabilities associated with the server component from the second plurality of records, the instructions further cause the information handling system to utilize a first relationship between the first relation and the second relation, wherein the first relationship is based at least on a foreign key of the second relation; and wherein, to determine, based at least on the selection of the at least one capability, the list of attributes associated with the at least one capability from the third plurality of records associated with the third relation, the instructions further cause the information handling system to utilize a second relationship between the second relation and the third relation, wherein the second relationship is based at least on a foreign key of the third relationship.

3. The information handling system of claim 1, wherein the instructions further cause the information handling system to:
if the first one or more records are not associated with the at least one attribute, the at least one capability, and the server component:
determine a configuration for a server of the second one or more servers that permits the server of the second one or more servers to be associated with the at least one attribute, the at least one capability, and the server component; and
provide the configuration for the server of the second one or more servers.

4. The information handling system of claim 3, wherein, after providing the configuration for the server of the second one or more servers, the server of the second one or more servers is configured to be at least a portion of a server solution.

5. The information handling system of claim 1, wherein the instructions further cause the information handling system to:
receive first information associated with the plurality of server components;
populate, based at least on the first information, the first plurality of records associated with the first relation;
receive second information associated with the plurality of capabilities associated with the server component;
populate, based at least on the second information, the second plurality of records associated with the second relation;
receive third information associated with the plurality of attributes associated with the plurality of capabilities; and
populate, based at least on the third information, the third plurality of records associated with the third relation.

6. The information handling system of claim 1, wherein the user interface includes a graphical user interface.

7. The information handling system of claim 6, wherein the graphical user interface is at least a portion of a web application.

8. A method, comprising:
providing, via a user interface, a list of server components associated with a first plurality of records, the first plurality of records associated with a first relation, the list of server components listing a plurality of server components;
receiving, via the user interface, a selection that indicates a server component of the list of server components listing the plurality of server components;
determining, based at least on the selection that indicates the server component, a list of capabilities associated with the server component from a second plurality of records, the second plurality of records associated with a second relation, the list of capabilities listing a plurality of capabilities associated with the server component;
providing, via the user interface, the list of capabilities listing the plurality of capabilities associated with the server component;
receiving, via the user interface, a selection of at least one capability from the list of capabilities;
determining, based at least on the selection of the at least one capability, a list of attributes associated with the at least one capability from a third plurality of records associated with a third relation, the list of attributes listing a plurality of attributes associated with the plurality of capabilities;
providing, via the user interface, the list of attributes listing the plurality of attributes associated with the plurality of capabilities;
receiving, via the user interface, a selection of at least one attribute from the list of attributes;
determining if first one or more records are associated with the at least one attribute, the at least one capability, and the server component, the first one or more records associated with a fourth relation and a first one or more servers;
if the first one or more records are associated with the at least one attribute, the at least one capability, and the server component:
providing, via the user interface, a first list of one or more server identifications that indicates the first one or more servers, the first list of one or more servers identifications associated with the first one or more records; and
if the first one or more records are not associated with the at least one attribute, the at least one capability, and the server component:
determining second one or more records associated with the at least one attribute, the at least one capability, and the server component, the second one or more records associated with the fourth relation and a second one or more servers; and
providing a second list of one or more server identifications that indicates the second one or more servers, the second list of one or more server identifications associated with the second one or more records.

9. The method of claim 8, wherein determining, based at least on the selection that indicates the server component, the list of capabilities associated with the server component from the second plurality of records includes utilizing a first relationship between the first relation and the second relation, wherein the first relationship is based at least on a foreign key of the second relation; and
wherein determining, based at least on the selection of the at least one capability, the list of attributes associated with the at least one capability from the third plurality of records associated with the third relation includes utilizing a second relationship between the second relation and the third relation, wherein the second relationship is based at least on a foreign key of the third relationship.

10. The method of claim 8, further comprising:
if the first one or more records are not associated with the at least one attribute, the at least one capability, and the server component:
determining a configuration for a server of the second one or more servers that permits the server of the second one or more servers to be associated with the at least one attribute, the at least one capability, and the server component; and
providing the configuration for the server of the second one or more servers.

11. The method of claim 10, wherein, after the providing the configuration for the server of the second one or more servers, the server of the second one or more servers is configured to be at least a portion of a server solution.

12. The method of claim 8, further comprising:
receiving first information associated with the plurality of server components;
populating, based at least on the first information, the first plurality of records associated with the first relation;
receiving second information associated with the plurality of capabilities associated with the server component;
populating, based at least on the second information, the second plurality of records associated with the second relation;
receiving third information associated with the plurality of attributes associated with the plurality of capabilities; and
populating, based at least on the third information, the third plurality of records associated with the third relation.

13. The method of claim 8, wherein the user interface includes a graphical user interface.

14. The method of claim 13, wherein the graphical user interface is at least a portion of a web application.

15. A computer-readable non-transitory memory medium that includes instructions that, when executed by at least one processor of an information handling system, cause the information handling system to:
provide, via a user interface, a list of server components associated with a first plurality of records, the first plurality of records associated with a first relation, the list of server components listing a plurality of server components;
receive, via the user interface, a selection that indicates a server component of the list of server components listing the plurality of server components;
determine, based at least on the selection that indicates the server component, a list of capabilities associated with the server component from a second plurality of records, the second plurality of records associated with a second relation, the list of capabilities listing a plurality of capabilities associated with the server component;
provide, via the user interface, the list of capabilities listing the plurality of capabilities associated with the server component;
receive, via the user interface, a selection of at least one capability from the list of capabilities;
determine, based at least on the selection of the at least one capability, a list of attributes associated with the at least one capability from a third plurality of records associated with a third relation, the list of attributes listing a plurality of attributes associated with the plurality of capabilities;
provide, via the user interface, the list of attributes listing the plurality of attributes associated with the plurality of capabilities;
receive, via the user interface, a selection of at least one attribute from the list of attributes;
determine if first one or more records are associated with the at least one attribute, the at least one capability, and the server component, the first one or more records associated with a fourth relation and a first one or more servers;
if the first one or more records are associated with the at least one attribute, the at least one capability, and the server component:
provide, via the user interface, a first list of one or more server identifications that indicates the first one or more servers, the first list of one or more server identifications associated with the first one or more records; and
if the first one or more records are not associated with the at least one attribute, the at least one capability, and the server component:
determine second one or more records associated with the at least one attribute, the at least one capability, and the server component, the second one or more records associated with the fourth relation and a second one or more servers; and
provide a second list of one or more server identifications that indicates the second one or more servers, the second list of one or more server identifications associated with the second one or more records.

16. The computer-readable non-transitory memory medium of claim 15, wherein, to determine, based at least on the selection that indicates the server component, the list of capabilities associated with the server component from the second plurality of records the instructions further cause the information handling system to utilize a first relationship between the first relation and the second relation, wherein the first relationship is based at least on a foreign key of the second relation; and
wherein, to determine, based at least on the selection of the at least one capability, the list of attributes associated with the at least one capability from the third plurality of records associated with the third relation, the instructions further cause the information handling system to utilize a second relationship between the second relation and the third relation, wherein the second relationship is based at least on a foreign key of the third relationship.

17. The computer-readable non-transitory memory medium of claim 15, wherein the instructions further cause the information handling system to:
if the first one or more records are not associated with the at least one attribute, the at least one capability, and the server component:
determine a configuration for a server of the second one or more servers that permits the server of the second one or more servers to be associated with the at least one attribute, the at least one capability, and the server component; and
provide the configuration for the server of the second one or more servers.

18. The computer-readable non-transitory memory medium of claim 3, wherein, after providing the configuration for the server of the second one or more servers, the server of the second one or more servers is configured to be at least a portion of a server solution.

19. The computer-readable non-transitory memory medium of claim 15, wherein the instructions further cause the information handling system to:
receive first information associated with the plurality of server components;
populate, based at least on the first information, the first plurality of records associated with the first relation;
receive second information associated with the plurality of capabilities associated with the server component;
populate, based at least on the second information, the second plurality of records associated with the second relation;
receive third information associated with the plurality of attributes associated with the plurality of capabilities; and populate, based at least on the third information, the third plurality of records associated with the third relation.

20. The computer-readable non-transitory memory medium of claim 15, wherein the user interface includes at least a portion of a web application.

\* \* \* \* \*